(12) United States Patent
Kakeya et al.

(10) Patent No.: US 12,163,053 B2
(45) Date of Patent: Dec. 10, 2024

(54) ANTIREFLECTION FILM AND MULTILAYER FILM HAVING ANTIREFLECTION FILM

(71) Applicant: MITSUBISHI GAS CHEMICAL COMPANY, INC., Tokyo (JP)

(72) Inventors: Fumiaki Kakeya, Tokyo (JP); Yasutaka Fukunaga, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 685 days.

(21) Appl. No.: 17/421,633

(22) PCT Filed: Jan. 8, 2020

(86) PCT No.: PCT/JP2020/000251
§ 371 (c)(1),
(2) Date: Jul. 8, 2021

(87) PCT Pub. No.: WO2020/145286
PCT Pub. Date: Jul. 16, 2020

(65) Prior Publication Data
US 2022/0073755 A1 Mar. 10, 2022

(30) Foreign Application Priority Data

Jan. 10, 2019 (JP) ................................. 2019-002846

(51) Int. Cl.
*C09D 5/00* (2006.01)
*C08J 5/18* (2006.01)
(Continued)

(52) U.S. Cl.
CPC ................ *C09D 5/006* (2013.01); *C08J 5/18* (2013.01); *C08J 7/042* (2013.01); *C09D 135/02* (2013.01);
(Continued)

(58) Field of Classification Search
CPC .............. C09D 5/006; C08J 5/18; C08J 7/042
(Continued)

(56) References Cited

U.S. PATENT DOCUMENTS

| | | | |
|---|---|---|---|
| 2010/0021694 A1* | 1/2010 | Wakizaka | ............... G02B 1/111 |
| | | | 524/544 |
| 2021/0053330 A1 | 2/2021 | Kakeya et al. | |

FOREIGN PATENT DOCUMENTS

| | | | |
|---|---|---|---|
| EP | 3 757 625 A1 | 12/2020 | |
| JP | 2000187102 A * | 7/2000 | .......... C08F 222/105 |

(Continued)

OTHER PUBLICATIONS

Translationof2000187102 (Year: 2024).*
(Continued)

*Primary Examiner* — Jerry L Brooks
(74) *Attorney, Agent, or Firm* — GREENBLUM & BERNSTEIN, P.L.C.

(57) ABSTRACT

An antireflection film is provided and includes a base material layer that contains a thermoplastic resin and a high refractive index layer that is superposed on at least one surface of the base material layer, while having a refractive index that is higher than the refractive index of the base material layer, and which is configured such that the high refractive index layer contains a fluorene diol, an isocyanate and a polymer of a resin material that contains a (meth) acrylate and a urethane (meth)acrylate derived from a (meth) acrylate.

20 Claims, 3 Drawing Sheets

(51) Int. Cl.
*C08J 7/04* (2020.01)
*C09D 135/02* (2006.01)
*G02B 1/111* (2015.01)

(52) U.S. Cl.
CPC ........... *G02B 1/111* (2013.01); *C08J 2369/00* (2013.01); *C08J 2435/02* (2013.01)

(58) Field of Classification Search
USPC ......................................................... 359/601
See application file for complete search history.

(56) References Cited

FOREIGN PATENT DOCUMENTS

| | | | |
|---|---|---|---|
| JP | 2004-196965 A | | 7/2004 |
| JP | 2006-022312 A | | 1/2006 |
| JP | 2006327990 A | * | 12/2006 |
| JP | 2007-262124 A | | 10/2007 |
| JP | 2012-227190 A | | 11/2012 |
| JP | 2013-119605 A | | 6/2013 |
| JP | 2013-137485 A | | 7/2013 |
| JP | 2013-227394 A | | 11/2013 |
| JP | 2014-041244 A | | 3/2014 |
| JP | 2014-232279 A | | 12/2014 |
| JP | 2017-132859 A | | 8/2017 |
| KR | 10-2011-0076489 A | | 7/2011 |

OTHER PUBLICATIONS

Translation of 2006327990 (Year: 2024).*
International Search Report issued in International Patent Application No. PCT/JP2020/000251, dated Apr. 7, 2020, along with English translation thereof.
Written Opinion of the International Searching Authority issued in International Patent Application No. PCT/JP2020/000251, dated Apr. 7, 2020, along with English translation thereof.
Extended European Search Report issued to the corresponding Patent Application No. 20737866.2 dated Sep. 2, 2022.

* cited by examiner

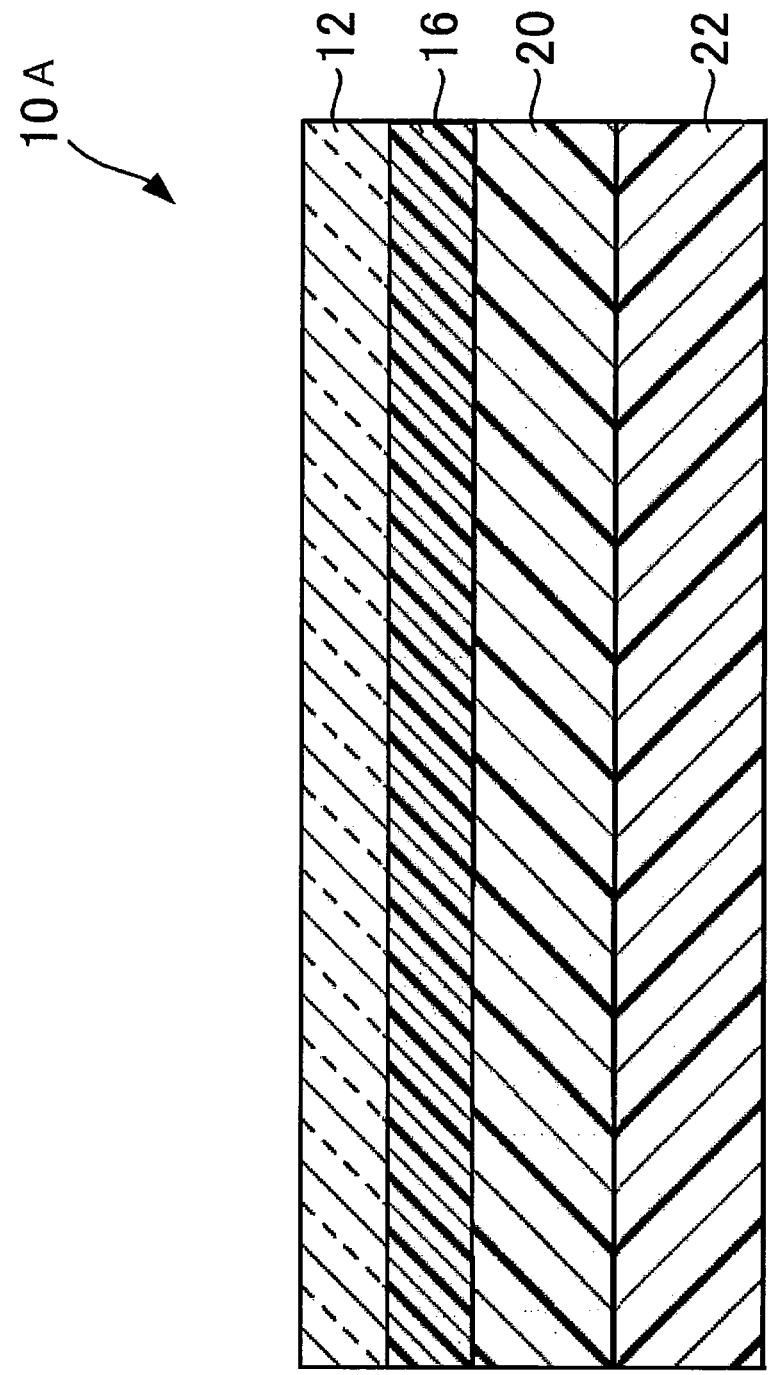
[Figure 1]

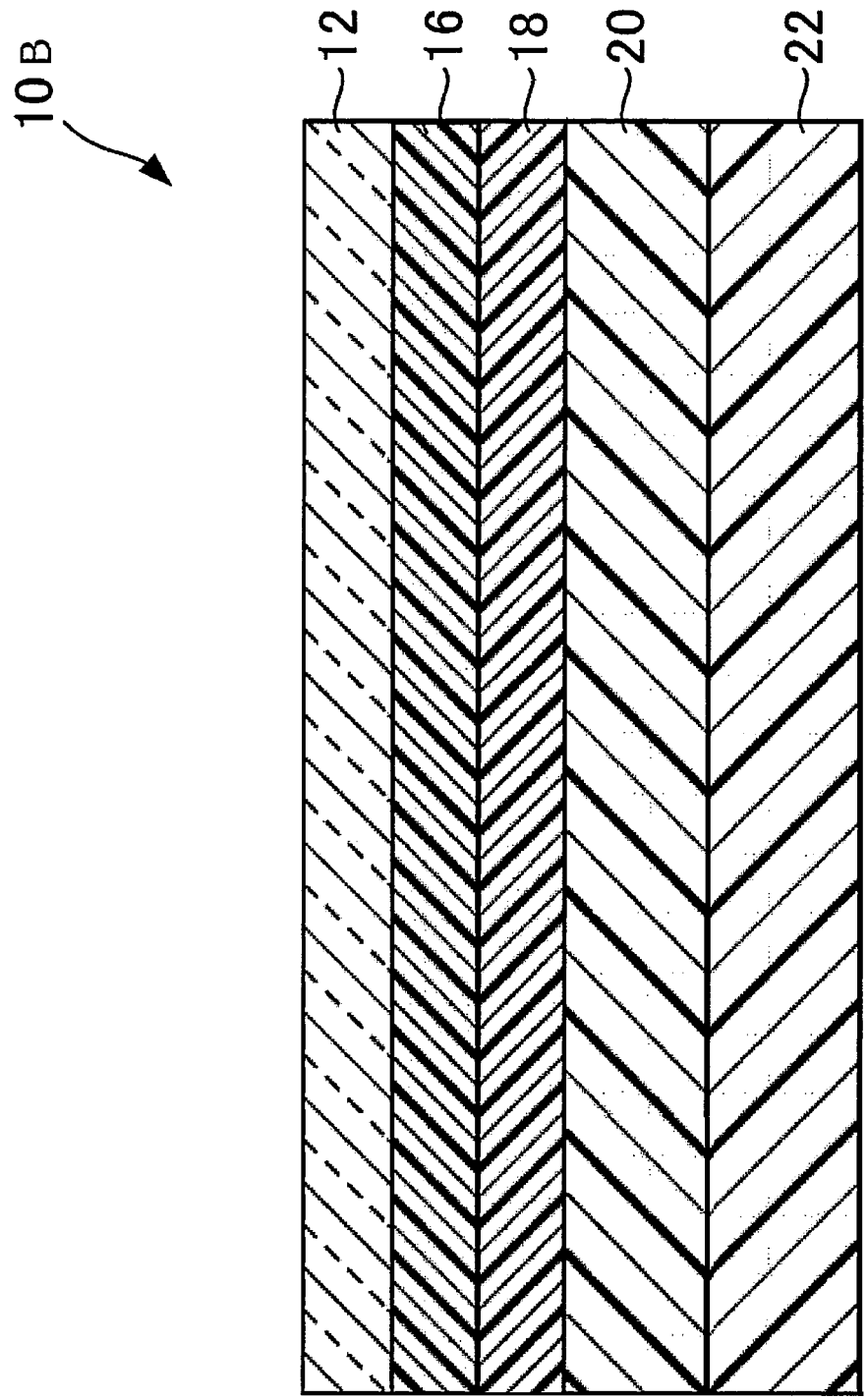
[Figure 2]

[Figure 3]
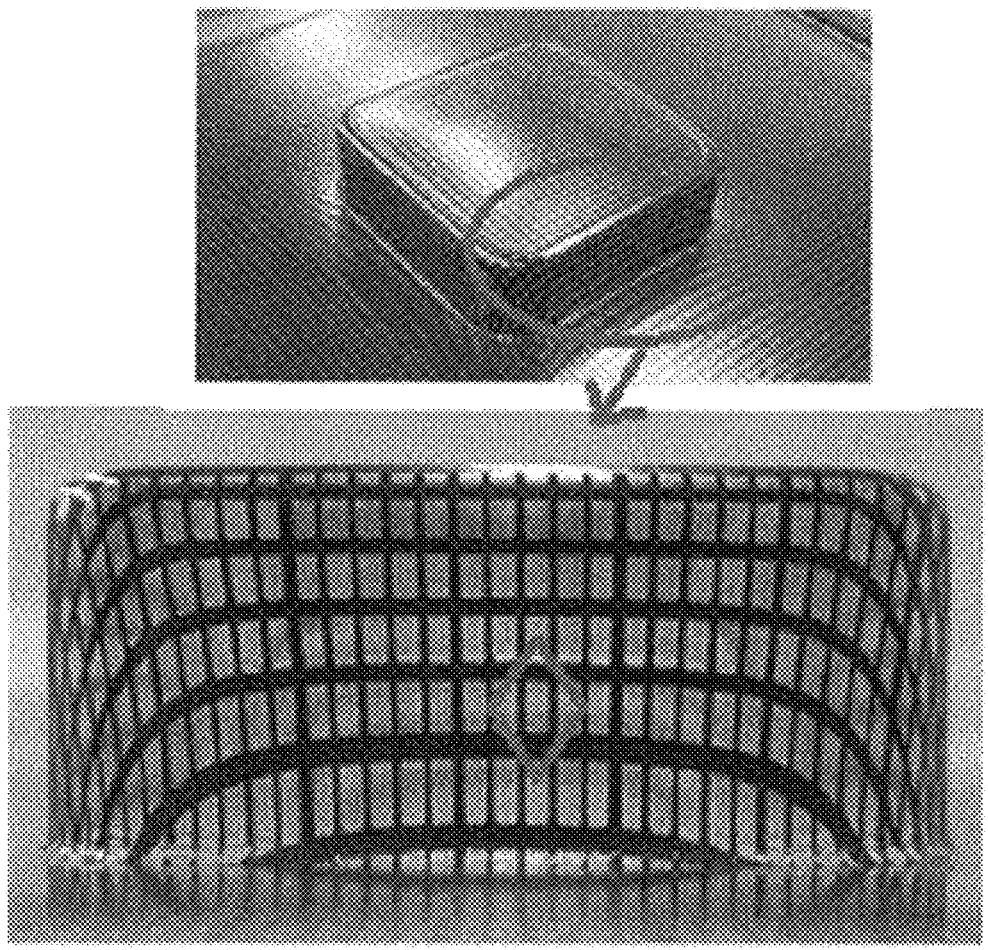

ANTIREFLECTION FILM AND MULTILAYER FILM HAVING ANTIREFLECTION FILM

TECHNICAL FIELD

The present invention relates to an anti-reflection film including a base material layer and a high-refractive-index layer having a refractive index that is higher than the refractive index of the base material layer, and a layered product film having the anti-reflection film.

BACKGROUND ART

A layered film having a surface having low reflectivity which can be used as an anti-reflection film is conventionally known (see Patent Document 1). Layered films having low surface reflectivity are used for applications including a computer screen, a television screen, a plasma display panel, a surface of a polarizing plate to be used for a liquid crystal display, a sunglass lens, a prescription glass lens, a finder lens for a camera, a cover for various instruments, glass of automobiles, glass of trains, a display panel for a vehicle, an electronic equipment casing, etc.

PRIOR ART DOCUMENTS

Patent Documents

Patent Document 1: Japanese Laid-Open Patent Publication No. 2014-41244

SUMMARY OF THE INVENTION

Problems to be Solved by the Invention

Many layered films conventionally used as anti-reflection films for the above-described applications do not have sufficient thermoformability and do not necessarily have satisfactory abrasion resistance.

The problem to be solved by the present invention is to provide an anti-reflection film that is a layered product having low surface reflectivity, excellent thermoformability and satisfactory abrasion resistance, and a layered product film having the anti-reflection film.

Means for Solving the Problems

The present inventors diligently made researches in order to solve the above-described problems and found that an anti-reflection film, which has: a base material layer including a thermoplastic resin; and a high-refractive-index layer, wherein the high-refractive-index layer includes a polymer of a predetermined resin material, is excellent in thermoformability and abrasion resistance, and thus the present invention was achieved.

Specifically, the present invention includes the below-described matters.

(1) An anti-reflection film, which has:
  a base material layer including a thermoplastic resin; and
  a high-refractive-index layer, which is layered on at least one surface of the base material layer, and which has a refractive index that is higher than the refractive index of the base material layer, wherein
  the high-refractive-index layer includes a polymer of a resin material that includes: a urethane (meth)acrylate derived from a fluorene-based diol, an isocyanate and a (meth)acrylate; and a (meth)acrylate.

(2) The anti-reflection film according to item (1), wherein the base material layer has a refractive index of 1.49 to 1.65 and the high-refractive-index layer has a refractive index of 1.68 to 1.75.

(3) The anti-reflection film according to item (1), wherein the urethane (meth)acrylate is represented by formula (I):

(A3)-O(OC)HN-A2-HN(OC)—O-A1-O—(CO)NH-A2-NH—(CO)O-(A3)   (I)

wherein:
  A1 is a substituted or unsubstituted fluorene-based diol-derived alkylene group having a total carbon number of 8 to 60;
  A2s are each independently a substituted or unsubstituted aromatic isocyanate-derived alkylene group having a total carbon number of 6 to 20; and
  A3s are each independently a substituted or unsubstituted alkyl group having a total carbon number of 4 to 30 including at least one (meth)acryloyloxy group.

(4) The anti-reflection film according to item (3), wherein the urethane (meth)acrylate includes a compound represented by any one of formulae (II), (III), (IV) and (V):

(II)

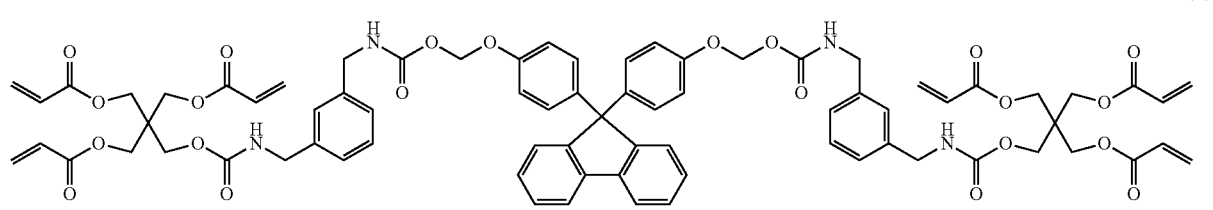

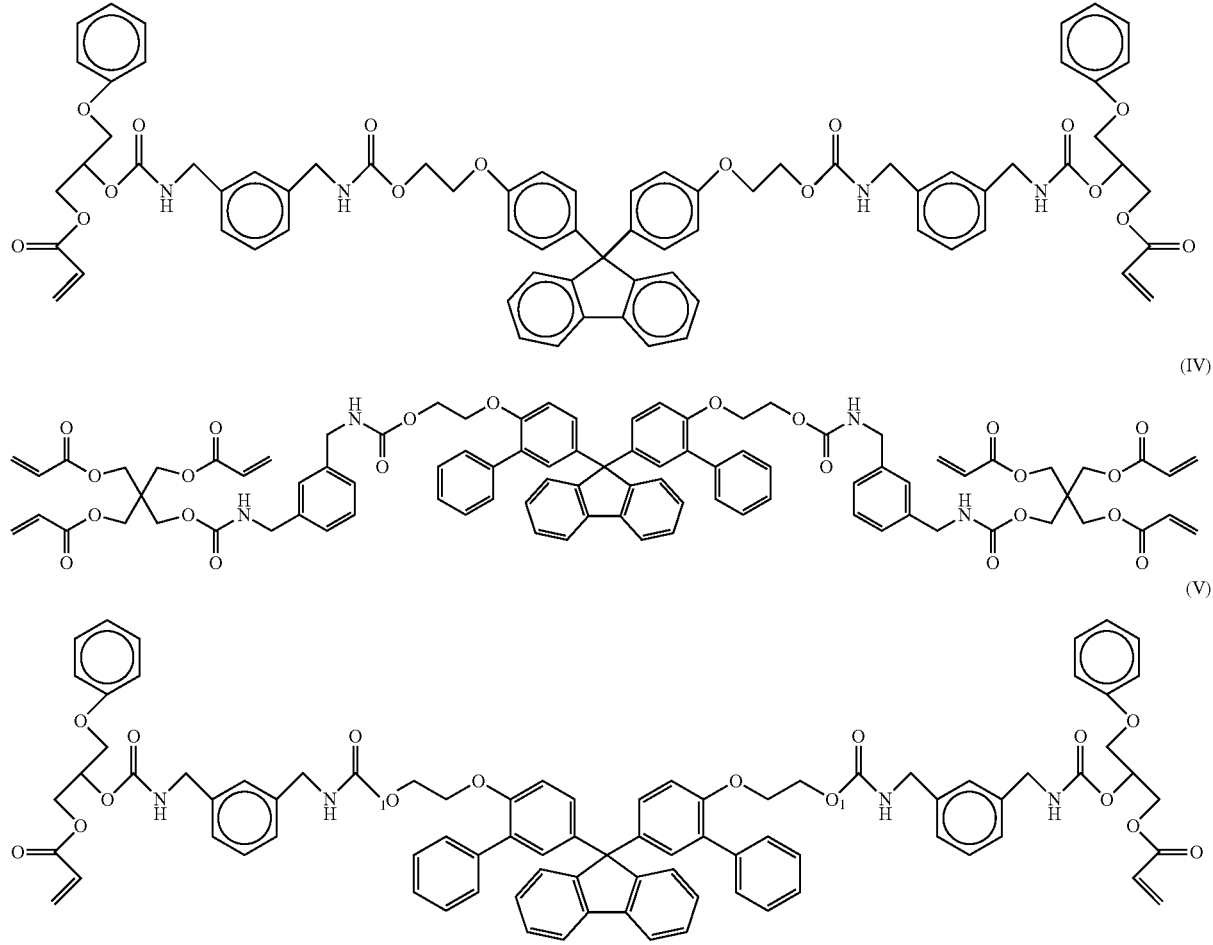

(5) The anti-reflection film according to item (1), wherein the (meth)acrylate is a substituted or unsubstituted compound having a total carbon number of 4 to 20 including at least one (meth)acryloyloxy group and at least one vinyl ether group.

(6) The anti-reflection film according to item (1), wherein the (meth)acrylate is a bisphenol A di(meth)acrylate compound having an ethoxy group.

(7) The anti-reflection film according to item (1), wherein the high-refractive-index layer further includes a high-refractive-index member.

(8) The anti-reflection film according to item (7), wherein the high-refractive-index member includes zirconia.

(9) The anti-reflection film according to item (7), wherein the high-refractive-index layer includes the resin material and the high-refractive-index member at a weight ratio of 10:90 to 40:60.

(10) The anti-reflection film according to item (1), wherein the high-refractive-index layer includes a photoinitiator.

(11) The anti-reflection film according to item (1), wherein the resin material includes the urethane (meth) acrylate and the (meth)acrylate at a weight ratio of 99:1 to 50:50.

(12) The anti-reflection film according to item (1), which includes the base material layer whose number is 2 or more.

(13) The anti-reflection film according to item (1), wherein the base material layer has a thickness of 50 to 500 μm and the high-refractive-index layer has a thickness of 10 to 200 nm.

(14) The anti-reflection film according to item (1), which further has a low-refractive-index layer having a refractive index that is lower than the refractive index of the base material layer, wherein the low-refractive-index layer is layered on the surface of the high-refractive-index layer and the surface is opposite to the base material layer.

(15) The anti-reflection film according to item (14), wherein the base material layer has a refractive index of 1.49 to 1.65, the high-refractive-index layer has a refractive index of 1.68 to 1.75 and the low-refractive-index layer has a refractive index of 1.31 to 1.40.

(16) The anti-reflection film according to item (14), wherein the base material layer has a thickness of 50 to 500 μm, the high-refractive-index layer has a thickness of 10 to 200 nm and the low-refractive-index layer has a thickness of 10 to 200 nm.

(17) The anti-reflection film according to any one of items (1) to (16), wherein regarding a sample of the anti-reflection film obtained by being cut into a size of 210 mm×297 mm×0.3 mm (thickness), when the base material layer is preheated at 190° C. for 40 seconds, the sample is placed in a mold including a right angle-shaped projection having a deep drawing height of 1 mm or more and a size of 30 mm×30 mm in a manner such that the base material layer is in contact with the mold, and the sample is subjected to pressure forming using high pressure air of 1.5 MPa, the radius R of an area in which a pressure formed body obtained is in contact with the right angle-shaped portion of the mold is 3.0 mm or less.

(18) An anti-reflection film, which has:
   a base material layer including a thermoplastic resin; and
   a high-refractive-index layer, which is layered on at least one surface of the base material layer, and which has a refractive index that is higher than the refractive index of the base material layer, wherein
   regarding a sample of the anti-reflection film obtained by being cut into a size of 210 mm×297 mm×0.3 mm (thickness), when the base material layer is preheated at 190° C. for 40 seconds, the sample is placed in a mold including a right angle-shaped projection having a deep drawing height of 1 mm or more and a size of 30 mm×30 mm in a manner such that the base material layer is in contact with the mold, and the sample is subjected to pressure forming using high pressure air of 1.5 MPa, in an area in which a pressure formed body obtained is in contact with the right angle-shaped portion of the mold, an elongation rate (%) that is a value obtained by formula (A):

(Length between predetermined two points after pressure forming−Length between the predetermined two points before pressure forming)/Length between the predetermined two points before pressure forming×100(%)  (A)

is equal to or more than a value of the deep drawing height (mm) of the mold×10.

(19) An anti-reflection film, which has:
   a base material layer including a thermoplastic resin;
   a high-refractive-index layer, which is layered on at least one surface of the base material layer, and which has a refractive index that is higher than the refractive index of the base material layer; and
   a low-refractive-index layer, which has a refractive index that is lower than the refractive index of the base material layer, and which is layered on the surface of the high-refractive-index layer and the surface is opposite to the base material layer, wherein
   a value of the reflectivity on the surface of the low-refractive-index layer side measured under conditions of JIS Z 8722-2009 is 2.0% or less, and wherein
   regarding a sample of the anti-reflection film obtained by being cut into a size of 210 mm×297 mm×0.3 mm (thickness), when the base material layer is preheated at 190° C. for 40 seconds, the sample is placed in a mold including a right angle-shaped projection having a deep drawing height of 1 mm or more and a size of 30 mm×30 mm in a manner such that the base material layer is in contact with the mold, and the sample is subjected to pressure forming using high pressure air of 1.5 MPa, the radius R of an area in which a pressure formed body obtained is in contact with the right angle-shaped portion of the mold is 3.0 mm or less.

(20) A layered product film having a transparent resin base material and the anti-reflection film according to any one of items (1) to (19).

Advantageous Effect of the Invention

As described above, the anti-reflection film of the present invention has a base material layer and a high-refractive-index layer, which is layered on at least one surface of the base material layer, and which has a refractive index that is higher than the refractive index of the base material layer. Further, the reflectivity on the surface of the high-refractive-index layer side of the anti-reflection film is sufficiently high, and in addition, the anti-reflection film has excellent thermoformability and high abrasion resistance.

Since the anti-reflection film of the present invention has the above-described excellent characteristics, it can be suitably used for applications including display portions of a computer, a television, a plasma display and the like, a surface of a polarizing plate to be used for a liquid crystal display, a sunglass lens, a prescription glass lens, a finder lens for a camera, a display panel for a vehicle and an electronic equipment casing.

BRIEF DESCRIPTION OF THE DRAWINGS

FIG. 1 is a cross sectional view showing the layered structure of the anti-reflection film of Example 1.

FIG. 2 is a cross sectional view showing the layered structure of an anti-reflection film of a specific example different from that of Example 1.

FIG. 3 shows elongation of an anti-reflection film, wherein grid-like lines at predetermined intervals were printed on its surface, after pressure forming.

EMBODIMENTS FOR CARRYING OUT THE INVENTION

Hereinafter, the present invention will be described in detail. Note that the present invention is not limited to the below-described embodiments, and can be arbitrarily changed and then carried out within a range in which the effects of the present invention are exerted.

[Anti-Reflection Film]

The anti-reflection film of the present invention has: a base material layer including a thermoplastic resin; and a high-refractive-index layer, which is layered on at least one surface of the base material layer, and which has a refractive index that is higher than the refractive index of the base material layer. Hereinafter, respective layered members included in the anti-reflection film as a layered product will be described.

[Base Material Layer]

The base material layer included in the anti-reflection film includes a thermoplastic resin. The type of the thermoplastic resin is not particularly limited, and various resins including a polycarbonate (PC) resin, an acrylic resin such as polymethyl methacrylate (PMMA), polyethylene terephthalate (PET), triacetyl cellulose (TAC), polyethylene naphthalate (PEN), polyimide (PI), a cycloolefin copolymer (COC), a norbornene-containing resin, polyether sulfone, cellophane and aromatic polyamide may be used. Among these materials, at least a polycarbonate resin is preferably included in the thermoplastic resin of the base material layer.

The polycarbonate resin which may be included in the base material layer is not particularly limited as long as it contains a carbonate bond in the main chain of the molecule, i.e., it contains a —[O—R—OCO]— unit (R includes an aliphatic group, an aromatic group, or both of the aliphatic group and the aromatic group, and further has a linear structure or a branched structure), but a polycarbonate and the like having a bisphenol skeleton are preferred, and a polycarbonate having a bisphenol A skeleton or bisphenol C skeleton is particularly preferred. As the polycarbonate resin, a mixture or copolymer of bisphenol A and bisphenol C may be used. By using a bisphenol C-based polycarbonate resin such as a polycarbonate resin consisting of only bisphenol C and a polycarbonate resin of a mixture or copolymer of bisphenol C and bisphenol A, the hardness of the base material layer can be improved.

Further, the viscosity average molecular weight of the polycarbonate resin is preferably 15,000 to 40,000, more preferably 20,000 to 35,000, and even more preferably 22,500 to 25,000.

The acrylic resin which may be included in the base material layer is not particularly limited, and examples thereof include homopolymers of (meth)acrylic acid esters typified by polymethyl methacrylate (PMMA) and methyl methacrylate (MMA), copolymers of PMMA or MMA and at least one monomer other than that, and mixtures of a plurality of these resins. Among them, a (meth)acrylate including a cyclic alkyl structure excellent in low birefringence, low moisture absorbency and heat resistance is preferred. Examples of the above-described (meth)acrylic resins include, but are not limited to, ACRYPET (manufactured by Mitsubishi Rayon Co., Ltd.), DELPET (manufactured by Asahi Kasei Chemicals Corporation) and PARAPET (manufactured by Kuraray Co., Ltd.).

Note that use of a mixture including the polycarbonate resin and the above-described acrylic resin is preferred on the point that the hardness of the base material layer, in particular, a surface layer of the base material layer of the layered product (a layer at the high-refractive-index layer side) can be improved thereby.

As a component other than the thermoplastic resin, an additive may be included in the base material layer. Examples thereof include at least one additive selected from the group consisting of a thermal stabilizer, an antioxidant, a flame retardant, a flame retardant auxiliary agent, an ultraviolet absorber, a mold release agent and a coloring agent. Further, an antistatic agent, a fluorescent brightener, an antifog additive, a flowability improving agent, a plasticizer, a dispersant, an antimicrobial agent, etc. may also be added to the base material layer.

The base material layer includes the thermoplastic resin in an amount of preferably 80% by mass or more, more preferably 90% by mass or more, and particularly preferably 95% by mass or more. Further, in the thermoplastic resin of the base material layer, the polycarbonate resin is included in an amount of preferably 80% by mass or more, more preferably 90% by mass or more, and particularly preferably 95% by mass or more.

The base material layer preferably has a refractive index of 1.49 to 1.65. The refractive index of the base material layer is more preferably 1.49 to 1.60, even more preferably 1.51 to 1.60, and particularly preferably about 1.53 to 1.59.

The thickness of the base material layer is not particularly limited, but it is, for example, 30 μm to 1000 μm (1 mm), preferably 50 μm to 700 μm, more preferably 50 μm to 500 μm, and particularly preferably 100 μm to 500 μm. Further, two or more base material layers may be provided to the anti-reflection film, and in the case of providing a plurality of base material layers, the total thickness of the base material layers is, for example, 100 μm to 1000 μm, and preferably about 200 μm to 500 μm.

Examples of the above-described base material layer including a plurality of layers, i.e., the base material layer as a layered product having a plurality of layers include: a product obtained by layering, as a surface layer (a layer at the high-refractive-index layer side), an acrylic resin layer of the above-described acrylic resin such as a polymethyl (meth)acrylate resin (PMMA: polymethyl acrylate and/or polymethyl methacrylate) on a layer of the above-described polycarbonate (PC) such as bisphenol A; and a product obtained by layering a polycarbonate resin (PC) such as bisphenol C on a layer of a polycarbonate resin (PC) such as bisphenol A. In the case of a layered product obtained by layering a layer of a polycarbonate resin (PC) including bisphenol A and a polycarbonate resin (PC) including bisphenol C, for example, the polycarbonate resin including bisphenol C is used as a surface layer.

Further, as a surface layer, a layer having high hardness, in particular, a layer having a hardness higher than those of other base material layers is preferably used.

As the polycarbonate resin as the thermoplastic resin to be used in the layered product, like the polycarbonate resin forming the base material layer having a single layer, the above-described materials are suitably used. For example, a mixture or copolymer of bisphenol A and bisphenol C may be used. By using a bisphenol C-based polycarbonate resin such as a polycarbonate resin consisting of only bisphenol C and a polycarbonate resin of a mixture or copolymer of bisphenol C and bisphenol A, in particular, the effect of improving the hardness of the surface layer (the layer at the high-refractive-index layer side) of the base material layer in the layered product is obtained. Further, for further improving the hardness, a mixture obtained by adding the above-described acrylic resin to the polycarbonate resin such as the bisphenol C-based polycarbonate resin may be used.

[High-Refractive-Index Layer (Anti-Reflection Layer)]

The high-refractive-index layer included in the anti-reflection film has an anti-reflection function. The high-refractive-index layer as described above is used as an anti-reflection layer in a layered body.

The high-refractive-index layer includes a polymer of a resin material that includes: a urethane (meth)acrylate derived from a fluorene-based diol, an isocyanate and a (meth)acrylate; and a (meth)acrylate. Specifically, the high-refractive-index layer is preferably a mixture of: a urethane (meth)acrylate obtained by a dehydration condensation reaction of at least 3 components, which are a fluorene-based diol, an isocyanate and a (meth)acrylate; and a (meth)acrylate.

<Urethane (meth)acrylate>

The urethane (meth)acrylate included in the resin material of the high-refractive-index layer preferably includes at least a component represented by formula (I):

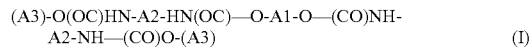

(A3)-O(OC)HN-A2-HN(OC)—O-A1-O—(CO)NH-A2-NH—(CO)O-(A3)  (I)

In formula (I):
  A1 is a substituted or unsubstituted fluorene-based diol-derived alkylene group having a total carbon number of 8 to 60;
  A2s are each independently a substituted or unsubstituted aromatic isocyanate-derived alkylene group having a total carbon number of 6 to 20; and
  A3s are each independently a substituted or unsubstituted alkyl group having a total carbon number of 4 to 30 including at least one (meth)acryloyloxy group, and derived from a (meth)acrylate.

Fluorene-Based Diol (A1)

The above-described alkylene group of A1 is, for example, derived from a fluorene-based diol which may have a substituent that is an aryl group such as a phenyl group, having a total carbon number of preferably 12 to 54, more preferably 16 to 48, and particularly preferably 20 to 40.

Typical specific examples of the fluorene-based diol for forming the structural unit of A1, i.e., a compound having a fluorene skeleton include the below-described materials. In this specification, the fluorene-based diol includes a fluorene compound including at least three hydroxyl groups.

Specifically, examples of the fluorene-based diol having two hydroxyl groups include 9,9-bis(hydroxyphenyl)fluorenes, 9,9-bis(hydroxy(poly)alkoxyphenyl)fluorenes, 9,9-bis(hydroxynaphthyl)fluorenes and 9,9-bis(hydroxy(poly)alkoxynaphthyl)fluorenes.

Examples of the fluorene-based diol having at least three hydroxyl groups include 9,9-bis(polyhydroxyphenyl)fluorenes, 9,9-bis[poly(hydroxy(poly)alkoxy)phenyl]fluorenes, 9,9-bis(polyhydroxynaphthyl)fluorenes and 9,9-bis[poly(hydroxy(poly)alkoxy)naphthyl]fluorenes.

Examples of 9,9-bis(hydroxyphenyl)fluorenes include 9,9-bis(hydroxyphenyl)fluorene [9,9-bis(4-hydroxyphenyl)fluorene (bisphenol fluorene), etc.] and 9,9-bis(hydroxyphenyl)fluorene having a substituent {e.g., 9,9-bis(alkyl-hydroxyphenyl)fluorene [9,9-bis(mono- or di-C1-4 alkyl-hydroxyphenyl)fluorene such as 9,9-bis(4-hydroxy-3-methylphenyl)fluorene (biscresol fluorene), 9,9-bis(4-hydroxy-3-ethylphenyl)fluorene, 9,9-bis(4-hydroxy-3-butylphenyl)fluorene, 9,9-bis(3-hydroxy-2-methylphenyl)fluorene, 9,9-bis(4-hydroxy-3,5-dimethylphenyl)fluorene and 9,9-bis(4-hydroxy-2,6-dimethylphenyl)fluorene, etc.], 9,9-bis(cycloalkyl-hydroxyphenyl)fluorene [9,9-bis(mono- or di-C5-8 cycloalkyl-hydroxyphenyl)fluorene such as 9,9-bis(4-hydroxy-3-cyclohexylphenyl)fluorene, etc.], 9,9-bis(aryl-hydroxyphenyl)fluorene [9,9-bis(mono- or di-C6-8 aryl-hydroxyphenyl)fluorene such as 9,9-bis(4-hydroxy-3-phenylphenyl)fluorene, etc.], 9,9-bis(aralkyl-hydroxyphenyl)fluorene [9,9-bis(C6-8 aryl C1-2 alkyl-hydroxyphenyl)fluorene such as 9,9-bis(4-hydroxy-3-benzylphenyl)fluorene, etc.], etc.}.

Examples of 9,9-bis(hydroxy(poly)alkoxyphenyl)fluorenes include 9,9-bis(hydroxyalkoxyphenyl)fluorene {e.g., 9,9-bis(hydroxy C2-4 alkoxyphenyl)fluorene such as 9,9-bis[4-(2-hydroxyethoxy)phenyl]fluorene, 9,9-bis[4-(2-hydroxypropoxy)phenyl]fluorene, 9,9-bis[4-(3-hydroxypropoxy)phenyl]fluorene and 9,9-bis[4-(4-hydroxybutoxy)phenyl]fluorene, etc.}, 9,9-bis(hydroxyalkoxy-alkylphenyl)fluorene {e.g., 9,9-bis(hydroxy C2-4 alkoxy-mono- or di-C1-6 alkylphenyl)fluorene such as 9,9-bis[4-(2-hydroxyethoxy)-3-methylphenyl]fluorene [or 2,2'-dimethyl-4,4'-(9-fluorenylidene)-bisphenoxyethanol], 9,9-bis[2-(2-hydroxyethoxy)-5-methylphenyl]fluorene, 9,9-bis[4-(2-hydroxyethoxy)-3-ethylphenyl]fluorene, 9,9-bis[4-(2-hydroxyethoxy)-3-propylphenyl]fluorene, 9,9-bis[4-(3-hydroxypropoxy)-3-methylphenyl]fluorene, 9,9-bis[4-(4-hydroxybutoxy)-3-methylphenyl]fluorene, 9,9-bis[4-(2-hydroxyethoxy)-3,5-dimethylphenyl]fluorene [or 2,2',6,6'-tetramethyl-4,4'-(9-fluorenylidene)-bisphenoxyethanol], 9,9-bis[4-(2-hydroxyethoxy)-3,5-diethylphenyl]fluorene, 9,9-bis[4-(3-hydroxypropoxy)-3,5-dimethylphenyl]fluorene and 9,9-bis[4-(4-hydroxybutoxy)-3,5-dimethylphenyl]fluorene, etc.}, 9,9-bis(hydroxyalkoxy-cycloalkylphenyl)fluorene {e.g., 9,9-bis(hydroxy C2-4 alkoxy-mono- or di-C5-8 cycloalkylphenyl)fluorene such as 9,9-bis[4-(2-hydroxyethoxy)-3-cyclohexylphenyl]fluorene, etc.}, 9,9-bis(hydroxyalkoxy-arylphenyl)fluorene {e.g., 9,9-bis(hydroxy C2-4 alkoxy-mono- or di-C6-8 arylphenyl)fluorene such as 9,9-bis[4-(2-hydroxyethoxy)-3-phenylphenyl]fluorene [or 2,2'-diphenyl-4,4'-(9-fluorenylidene)-bisphenoxyethanol] and 9,9-bis[4-(2-hydroxyethoxy)-3,5-diphenylphenyl]fluorene, etc.}, 9,9-bis(hydroxyalkoxy-aralkylphenyl)fluorene {e.g., 9,9-bis[hydroxy C2-4 alkoxy-mono- or di-(C6-8 aryl C1-4 alkyl)phenyl]fluorene such as 9,9-bis[4-(2-hydroxyethoxy)-3-benzylphenyl]fluorene and 9,9-bis[4-(2-hydroxyethoxy)-3,5-dibenzylphenyl]fluorene}, and 9,9-bis(hydroxypolyalkoxyphenyl)fluorenes, which correspond to these 9,9-bis(hydroxyalkoxyphenyl)fluorenes {e.g., 9,9-bis[(hydroxy C2-4 alkoxy) C2-4 alkoxyphenyl]fluorene such as 9,9-bis{4-[2-(2-hydroxyethoxy)ethoxy]phenyl}fluorene, etc.}.

Examples of 9,9-bis(hydroxynaphthyl)fluorenes include 9,9-bis(hydroxynaphthyl)fluorenes {e.g., substituted or unsubstituted 9,9-bis(monohydroxynaphthyl)fluorene such as 9,9-bis[6-(2-hydroxynaphthyl)]fluorene (or 6,6-(9-fluorenylidene)-di(2-naphthol)), 9,9-bis[1-(6-hydroxynaphthyl)]fluorene (or 5,5-(9-fluorenylidene)-di(2-naphthol)) and 9,9-bis[1-(5-hydroxynaphthyl)]fluorene (or 5,5-(9-fluorenylidene)-di(1-naphthol))}.

Examples of 9,9-bis(hydroxy(poly)alkoxynaphthyl)fluorenes include compounds corresponding to the aforementioned 9,9-bis(hydroxynaphthyl)fluorenes such as 9,9-bis(hydroxyalkoxynaphthyl)fluorene {e.g., substituted or unsubstituted 9,9-bis(hydroxy C2-4 alkoxynaphthyl)fluorene such as 9,9-bis[6-(2-(2-hydroxyethoxy)naphthyl)]fluorene, 9,9-bis[1-(6-(2-hydroxyethoxy)naphthyl)]fluorene [or 5,5'-(9-fluorenylidene)-bis(2-naphthyloxyethanol)] and 9,9-bis[1-(5-(2-hydroxyethoxy)naphthyl)]fluorene, etc.}.

Examples of 9,9-bis(polyhydroxyphenyl)fluorenes include 9,9-bis(dihydroxyphenyl)fluorenes and 9,9-bis(trihydroxyphenyl)fluorenes. Examples of 9,9-bis(dihydroxyphenyl)fluorenes include 9,9-bis(dihydroxyphenyl)fluorene [9,9-bis(3,4-dihydroxyphenyl)fluorene (biscatechol fluorene), 9,9-bis(3,5-dihydroxyphenyl)fluorene, etc.], and substituted 9,9-bis(dihydroxyphenyl)fluorene {e.g., 9,9-bis(alkyl-dihydroxyphenyl)fluorene [9,9-bis(mono- or di-C1-4 alkyl-dihydroxyphenyl)fluorene such as 9,9-bis(3,4-dihydroxy-5-methylphenyl)fluorene, 9,9-bis(3,4-dihydroxy-6-methylphenyl)fluorene and 9,9-bis(2,4-dihydroxy-3,6-dimethylphenyl)fluorene, etc.], 9,9-bis(aryl-dihydroxyphenyl)fluorene [e.g., 9,9-bis(mono- or di-C6-8 aryl-dihydroxyphenyl)fluorene such as 9,9-bis(3,4-dihydroxy-5-phenylphenyl)fluorene, etc.], 9,9-bis(alkoxy-dihydroxyphenyl)fluorene [e.g., 9,9-bis(mono- or di-C1-4 alkoxy-dihydroxyphenyl)fluorene such as 9,9-bis(3,4-dihydroxy-5-methoxyphenyl)fluorene], etc.}.

Examples of 9,9-bis(trihydroxyphenyl)fluorenes include 9,9-bis(trihydroxyphenyl)fluorene [e.g., 9,9-bis(2,4,6-trihydroxyphenyl)fluorene, 9,9-bis(2,4,5-trihydroxyphenyl)fluorene, 9,9-bis(3,4,5-trihydroxyphenyl)fluorene, etc.].

Examples of 9,9-bis[poly(hydroxy(poly)alkoxy)phenyl]fluorenes include 9,9-bis[di(hydroxy(poly)alkoxy)phenyl]fluorenes and 9,9-bis[tri(hydroxy(poly)alkoxy)phenyl]fluorenes.

Examples of 9,9-bis[di(hydroxy(poly)alkoxy)phenyl]fluorenes include: 9,9-bis[di(hydroxyalkoxy)phenyl]fluorenes such as 9,9-bis[di(hydroxyalkoxy)phenyl]fluorene {e.g., 9,9-bis[di(hydroxy C2-4 alkoxy)phenyl]fluorene such as 9,9-bis[3,4-di(2-hydroxyethoxy)phenyl]fluorene [or 2,2'-bishydroxyethoxy-4,4'-(9-fluorenylidene)-bisphenoxyethanol], 9,9-bis[3,5-di(2-hydroxyethoxy)phenyl]fluorene [or 3,3'-bishydroxyethoxy-5,5'-(9-fluorenylidene)-bisphenoxyethanol], 9,9-bis[3,4-di(3-hydroxypropoxy)phenyl]fluorene, 9,9-bis[3,5-di(3-hydroxypropoxy)phenyl]fluorene, 9,9-bis[3,4-di(2-hydroxypropoxy)phenyl]fluorene, 9,9-bis[3,5-di(2-hydroxypropoxy)phenyl]fluorene, 9,9-bis[3,4-di(4-hydroxybutoxy)phenyl]fluorene and 9,9-bis[3,5-di(4-hydroxybutoxy)phenyl]fluorene}, and substituted 9,9-bis[di(hydroxyalkoxy)phenyl]fluorene {e.g., 9,9-bis[alkyl-di(hydroxyalkoxy)phenyl]fluorene [e.g., 9,9-bis[mono- or di-C1-4 alkyl-di(hydroxy C2-4 alkoxy)phenyl]fluorene such as 9,9-bis[3,4-di(2-hydroxyethoxy)-5-methylphenyl]fluorene, 9,9-bis[3,4-di(2-hydroxyethoxy)-6-methylphenyl]fluorene and 9,9-bis[2,4-di(2-hydroxyethoxy)-3,6-dimethylphenyl]fluorene, etc.], 9,9-bis[aryl-di(hydroxyalkoxy)phenyl]fluorene [e.g., 9,9-bis[mono- or di-C6-8 aryl-di(hydroxy C2-4 alkoxy)phenyl]fluorene such as 9,9-bis[3,4-di(2-hydroxyethoxy)-5-arylphenyl]fluorene, etc.], 9,9-bis[alkoxy-di(hydroxyalkoxy)phenyl]fluorene [e.g., 9,9-bis[mono- or di-C1-4 alkoxy-di(hydroxy C2-4 alkoxy)phenyl]fluorene such as 9,9-bis[3,4-di(2-hydroxyethoxy)-5-methoxyphenyl]fluorene, etc.], etc.}; and 9,9-bis[di(hydroxypolyalkoxy)phenyl]fluorenes which correspond to these 9,9-bis[di(hydroxyalkoxy)phenyl]fluorenes {e.g., 9,9-bis[di(hydroxy C2-4 alkoxy C2-4 alkoxy phenyl]fluorene such as 9,9-bis{3,4-di[2-(2-hydroxyethoxy)ethoxy]phenyl}fluorene and 9,9-bis{3,5-di[2-(2-hydroxyethoxy)ethoxy]phenyl}fluorene, etc.}.

Examples of 9,9-bis[tri(hydroxy(poly)alkoxy)phenyl]fluorenes include compounds which correspond to the aforementioned 9,9-bis[di(hydroxy(poly)alkoxy)phenyl]fluorenes such as 9,9-bis[tri(hydroxyalkoxy)phenyl]fluorenes {e.g., 9,9-bis[tri(hydroxy C2-4 alkoxy)phenyl]fluorene such as 9,9-bis[2,3,4-tri(2-hydroxyethoxy)phenyl]fluorene [or 2,2',6,6'-tctrahydroxyethoxy-5,5'-(9-fluorenylidene)-bisphenoxyethanol], 9,9-bis[2,4,6-tri(2-hydroxyethoxy)phenyl]fluorene, 9,9-bis[2,4,5-tri(2-hydroxyethoxy)phenyl]fluorene and 9,9-bis[3,4,5-tri(2-hydroxyethoxy)phenyl]fluorene} and 9,9-bis[tri(hydroxypolyalkoxy)phenyl]fluorenes which correspond to these 9,9-bis[tri(hydroxyalkoxy)phenyl]fluorenes {e.g., 9,9-bis[tri(hydroxy C2-4 alkoxy C2-4 alkoxy phenyl]fluorene (compound wherein n=2) such as 9,9-bis{2,4,6-tri[2-(2-hydroxyethoxy)ethoxy]phenyl}fluorene, 9,9-bis{2,4,5-tri[2-(2-hydroxyethoxy)ethoxy]phenyl}fluorene and 9,9-bis{3,4,5-tri[2-(2-hydroxyethoxy)ethoxy]phenyl}fluorene, etc.}.

Examples of 9,9-bis(polyhydroxynaphthyl)fluorenes include compounds which correspond to the aforementioned 9,9-bis(hydroxynaphthyl)fluorenes such as 9,9-bis(di- or tri-hydroxynaphthyl)fluorene.

Examples of 9,9-bis[poly(hydroxy(poly)alkoxy)naphthyl]fluorenes include compounds which correspond to the aforementioned 9,9-bis(hydroxy(poly)alkoxynaphthyl)fluorenes such as 9,9-bis[di- or tri-(hydroxy(poly)alkoxy)naphthyl]fluorenes including 9,9-bis[di- or tri-(hydroxy C2-4 alkoxy)naphthyl]fluorene.

Preferred specific examples of the above-described fluorene-based diol include 9,9-bis[4-(2-hydroxyethoxy)phenyl]fluorene.

Isocyanate (A2)

The above-described alkylene group of A2 is, for example, derived from an aromatic isocyanate, which may have a substituent that is an alkyl group such as a methyl group, and which preferably has a total carbon number of 6 to 16, and it is more preferably derived from an aromatic isocyanate having 7 to 14 carbon atoms, and particularly preferably derived from an aromatic isocyanate having 8 to 12 carbon atoms.

The above-described isocyanate for forming the structural unit of A2 is preferably an aromatic isocyanate which can easily realize a high refractive index, but aliphatic and alicyclic isocyanates, etc. may also be used.

Examples thereof include polyisocyanates such as tolylene diisocyanate, diphenylmethane diisocyanate, hydrogenated diphenylmethane diisocyanate, polyphenylmethane polyisocyanate, modified diphenylmethane diisocyanate, hydrogenated xylylene diisocyanate, xylylene diisocyanate, hexamethylene diisocyanate, trimethyl hexamethylene diisocyanate, tetramethyl xylylene diisocyanate, isophorone diisocyanate, norbornene diisocyanate, 1,3-bis(isocyanatomethyl)cyclohexane, phenylene diisocyanate, lysine diisocyanate, lysine triisocyanate and naphthalene diisocyanate or trimer compounds or tetramer compounds of these polyisocyanates, burette-type polyisocyanates, water dispersion-type polyisocyanates (e.g., "Aquanate 100", "Aquanate 110", "Aquanate 200" and "Aquanate 210" manufactured by Nippon Polyurethane Industry Co., Ltd., etc.), or reaction products of these polyisocyanates and a polyol.

Among these isocyanates, diphenylmethane diisocyanate, toluene diisocyanate, naphthalene diisocyanate, a trimethylolpropane (TMP) adduct of toluene diisocyanate, an isocyanate body of toluene diisocyanate, a TMP adduct of xylene diisocyanate, etc. are preferred.

(Meth)acryloyloxy group-containing alkyl group (A3)

The above-described alkyl group of A3 may have a substituent such as an alkoxy group and an aryloxy group and is preferably an alkyl group having a total carbon number of 6 to 24, and the total carbon number is preferably 8 to 20. Further, the number of the (meth)acryloyloxy group in the alkyl group of A3 is preferably 1 to 3.

Preferred specific examples of the above-described component for forming the alkyl group of A3 include monofunctional (meth)acrylic compounds having a hydroxyl group.

Examples of the monofunctional (meth)acrylic compounds having a hydroxyl group include hydroxyl group-containing mono(meth)acrylates {e.g., hydroxyalkyl (meth)acrylates [e.g., hydroxy C2-20 alkyl-(meth)acrylate such as 2-hydroxyethyl (meth)acrylate, 3-hydroxypropyl (meth)acrylate and 6-hydroxyhexyl (meth)acrylate, more preferably hydroxy C2-12 alkyl-(meth)acrylate, and more preferably hydroxy C2-6 alkyl-(meth)acrylate], polyalkylene glycol mono(meth)acrylates [e.g., poly C2-4 alkylene glycol mono(meth)acrylate such as diethylene glycol mono(meth)acrylate and polyethylene glycol mono(meth)acrylate], mono(meth)acrylates of polyol having at least three hydroxyl groups [e.g., alkane polyol mono(meth)acrylate such as glycerol mono(meth)acrylate and trimethylolpropane mono(meth)acrylate, mono(meth)acrylate of multimer of alkane polyol such as diglycerol mono(meth)acrylate, etc.], etc.}, N-hydroxyalkyl (meth)acrylamides (e.g., N-hydroxy C1-4 alkyl (meth)acrylamide such as N-methylol (meth)acrylamide and N-(2-hydroxyethyl) (meth)acrylamide, etc.), and adducts (e.g., adducts in which about 1 to 5 mol of lactone is added) which are obtained by adding lactone (e.g., C4-10 lactone such as &-caprolactone) to a hydroxyl group of these compounds (e.g., hydroxyalkyl (meth)acrylate).

Note that these (meth)acrylic compounds may be used solely, or two or more of them may be used in combination.

Preferred specific examples of the compound for forming the (meth)acryloyloxy group-containing alkyl group (A3) include 2-hydroxy-3-phenoxypropyl acrylate.

Preferred specific examples of the urethane (meth)acrylate included in the above-described resin material include compounds of formula (II) to formula (V) below.

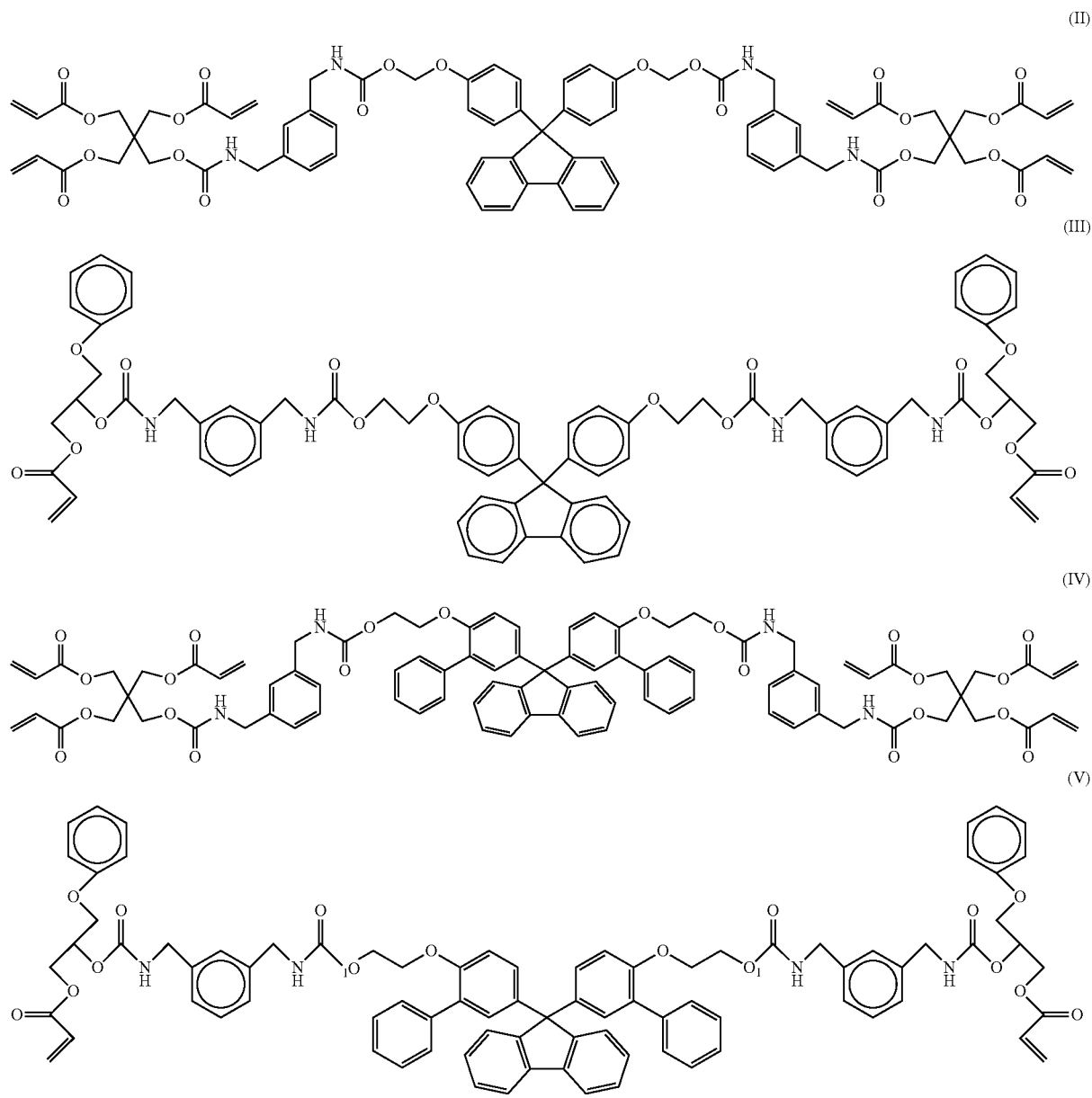

<(Meth)acrylate in Resin Material>

The (meth)acrylate included in the resin material of the high-refractive-index layer is preferably a substituted or unsubstituted compound having 4 to 20 carbon atoms including at least one (meth)acryloyloxy group and at least one vinyl ether group. The carbon number of the (meth)acrylate is preferably 6 to 18, and more preferably 8 to 16. Examples of substituents of the (meth)acrylate include an alkyl group.

As the (meth)acrylate, for example, 2-(2-vinyloxyethoxy)ethyl (meth)acrylate [2-(2-vinyloxyethoxy)ethyl acrylate: VEEA] of formula below is used.

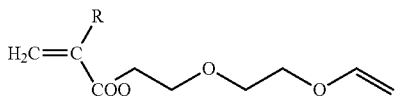

(In formula above, R is hydrogen or a methyl group.)

Preferred specific examples of the (meth)acrylate included in the resin material include a bisphenol A di(meth)acrylate compound having an ethoxy group. Preferred specific examples of the bisphenol A di(meth)acrylate compound having an ethoxy group include ethoxylated (3 mol) bisphenol A di(meth)acrylate, ethoxylated (4 mol) bisphenol A di(meth)acrylate, ethoxylated (10 mol) bisphenol A di(meth)acrylate and propoxylated (3 mol) bisphenol A diacrylate, and more preferred specific examples thereof include ethoxylated (4 mol) bisphenol A di(meth)acrylate.

In the resin material, the ratio between the urethane (meth)acrylate and the (meth)acrylate is preferably 99:1 to 50:50 (weight ratio), more preferably 95:5 to 70:30, even more preferably 93:7 to 80:20, and particularly preferably 90:10 to 85:15.

The value of the refractive index of the high-refractive-index layer is higher than the value of the refractive index of the base material layer, and the refractive index of the high-refractive-index layer is preferably 1.68 to 1.75, more preferably 1.69 to 1.74, and even more preferably about 1.70 to 1.73.

Further, the difference between the refractive index of the high-refractive-index layer and the refractive index of the base material layer is preferably at least 0.09, more preferably at least 0.12, even more preferably at least 0.15, and particularly preferably at least 0.17. Further, the range of the difference between the refractive index of the high-refractive-index layer and the refractive index of the base material layer is, for example, 0.03 to 0.70, preferably 0.10 to 0.50, and more preferably 0.15 to 0.26. By increasing the difference between the value of the refractive index of the high-refractive-index layer and the value of the refractive index of the base material layer as described above, the reflectivity of the surface at the high-refractive-index layer side of the anti-reflection film can be increased.

<High-Refractive-Index Member>

The high-refractive-index layer preferably includes a high-refractive-index member. The high-refractive-index member is added in order to increase the value of the refractive index of the high-refractive-index layer. Specifically, by forming the high-refractive-index layer using the high-refractive-index member, the difference between the refractive index of the high-refractive-index layer and the refractive index of the base material layer can be increased, thereby more increasing the reflectivity of the anti-reflection film.

Examples of the high-refractive-index member include titanium oxide, zirconium oxide ($ZrO_2$), zinc oxide, alumina, colloidal alumina, lead titanate, red lead, chrome yellow, zinc yellow, chrome oxide, ferric oxide, iron black, copper oxide, magnesium oxide, magnesium hydroxide, strontium titanate, yttrium oxide, hafnium oxide, niobium oxide, tantalum oxide ($Ta_2O_5$), barium oxide, indium oxide, europium oxide, lanthanum oxide, zircon, tin oxide and lead oxide, and double oxides thereof such as lithium niobate, potassium niobate, lithium tantalate and aluminum magnesium oxide ($MgAl_2O_4$).

Further, as the high-refractive-index member, a rare earth oxide can be used, and for example, scandium oxide, yttrium oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, lutetium oxide, etc. can be used.

Among the above-described many options, as the high-refractive-index member, zirconia (zirconium oxide) is preferred.

The high-refractive-index member is preferably a particulate member. The particle size (diameter: average particle size) of the particulate high-refractive-index member is not particularly limited, but it is, for example, 1 to 100 nm, preferably 5 to 50 nm, more preferably 7.5 to 30 nm, and particularly preferably 10 to 20 nm.

Further, for example, the particulate high-refractive-index member preferably includes an organic layer coating serving as a surface treatment layer for covering the outer surface of a metal oxide or the like. By the organic layer coating, the compatibility of the high-refractive-index member with respect to the resin material forming the high-refractive-index layer is improved, and the high-refractive-index member can be firmly bonded to the resin material.

As the surface treatment layer, for example, an organic layer coating in which an ultraviolet reactive (cured) type functional group is introduced into the surface thereof is preferred.

The high-refractive-index layer includes the resin material and the high-refractive-index member at a weight ratio of preferably 10:90 to 40:60, more preferably 15:85 to 35:65, and even more preferably 20:80 to 30:70.

<Other Components>

The high-refractive-index layer or the resin material forming the high-refractive-index layer preferably includes at least one of a photoinitiator (photopolymerization initiator) and a leveling agent, and particularly preferably includes a photoinitiator. In addition, the resin material may include a solvent. Examples of the leveling agent include a fluorine-based leveling agent, an acrylic leveling agent and a silicone-based leveling agent.

<Thickness and Arrangement of High-Refractive-Index Layer>

The thickness of the high-refractive-index layer is not particularly limited, but it is preferably 10 to 300 nm, more preferably 50 to 250 nm, even more preferably 100 to 200 nm, and particularly preferably 130 to 170 nm.

The high-refractive-index layer is preferably layered between the base material layer and a low-refractive-index layer, which will be described in detail later. The anti-reflection film having such a layered structure can surely reduce the reflectivity of the whole film.

[Low-Refractive-Index Layer (Anti-Reflection Layer)]

It is preferred that the anti-reflection film further has a low-refractive-index layer. The low-refractive-index layer has a refractive index that is lower than the refractive index of the base material layer, and has an anti-reflection function like the high-refractive-index layer. The low-refractive-index layer is preferably layered on the surface of the high-refractive-index layer and the surface is opposite to the base material layer.

The low-refractive-index layer preferably includes a polymer of a resin material (resin material for the low-refractive-index layer) including a fluorine-containing urethane acrylate and a (meth)acrylate. Specifically, the low-refractive-index layer is preferably formed by curing and polymerizing a resin material including at least a fluorine-containing urethane acrylate and a (meth)acrylate.

For suppressing the reflection of the anti-reflection film, the low-refractive-index layer is preferably positioned at the outermost position of the anti-reflection film.

<Fluorine-Containing Urethane Acrylate>

The fluorine-containing urethane acrylate included in the resin material of the low-refractive-index layer preferably includes at least a component represented by formula (IV):

(A3)-O(OC)HN-A2-HN(OC)—O-A1-O—(CO)NH-
A2-NH—(CO)O-(A3)    (IV)

In formula (IV) above, A1 is preferably a substituted or unsubstituted fluorine-containing diol-derived alkylene group having a total carbon number of 8 or less, and the total carbon number is preferably 6 or less, for example, 4. Examples of substituents included in the alkylene group of A1 include an alkyl group.

In formula (IV) above, A2s are each independently a substituted or unsubstituted and aliphatic or alicyclic isocyanate-derived alkylene group having a total carbon number of 4 to 20. The carbon number of A2s is preferably 6 to 16, and more preferably 8 to 12. Examples of substituents of the alkylene group of A2s include an alkyl group.

Further, as the alicyclic isocyanate forming A2s, for example, isophorone diisocyanate of formula below is used.

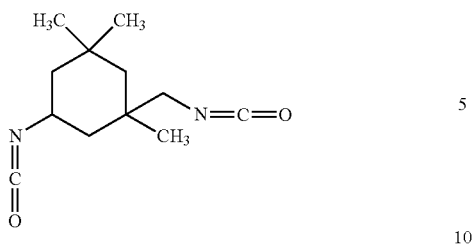

In formula (IV) above, A3s are each independently a substituted or unsubstituted alkyl group having a total carbon number of 4 to 30 including at least one (meth) acryloyloxy group. The total carbon number of A2s is preferably 6 to 20, and more preferably 8 to 16. Examples of substituents of the alkyl group of A3s include a branched alkyl group. A3s preferably include at least two (meth) acryloyloxy groups, for example, three (meth)acryloyloxy groups.

Further, as a compound forming A3s, for example, pentaerythritol triacrylate of formula below is used.

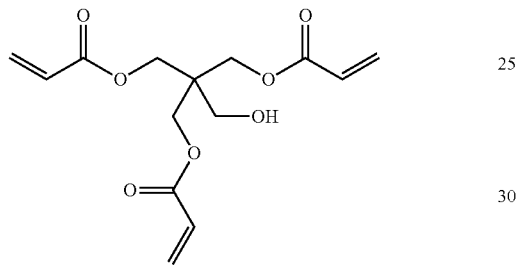

The fluorine-containing urethane acrylate is formed from the above-described compounds and includes, for example, a compound represented by formula below:

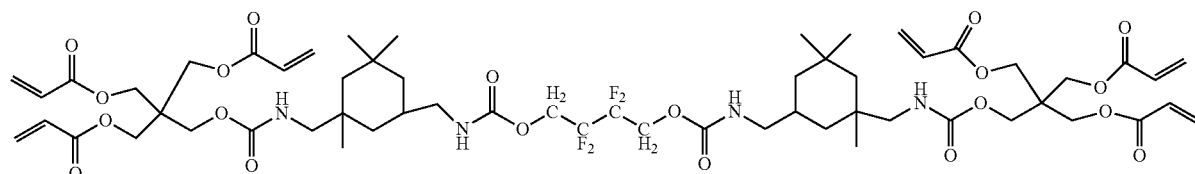

As described above, as a material monomer of the low-refractive-index layer, the fluorine-containing urethane acrylate is preferably used, but the low-refractive-index layer is not limited thereto. For example, the low-refractive-index layer may be formed from a polymer of urethane acrylate and a low-refractive-index member described later as main components.

As the polymer of urethane acrylate that may be used in combination with the low-refractive-index member, a urethane acrylate including a cyclic skeleton is preferred. More specific examples thereof include: a polymer of an isocyanate compound and an acrylate compound; and a polymer of an isocyanate compound, an acrylate compound and a polyol compound respectively represented by formulae below.

Examples of the isocyanate compound include dicyclohexylmethane diisocyanate (H12MDI), isophorone diisocyanate (IPDI) and xylylene diisocyanate (XDI) represented by formulae below.

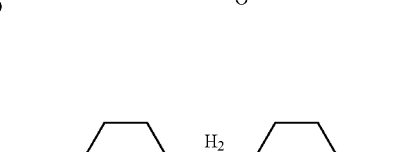

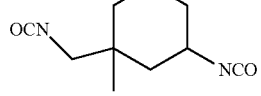

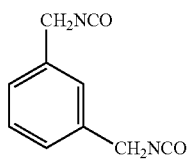

Examples of the acrylate compound include pentaerythritol triacrylate (PETA) and hydroxypropyl (meth)acrylate (hydroxypropyl acrylate: HPA) represented by formulae below.

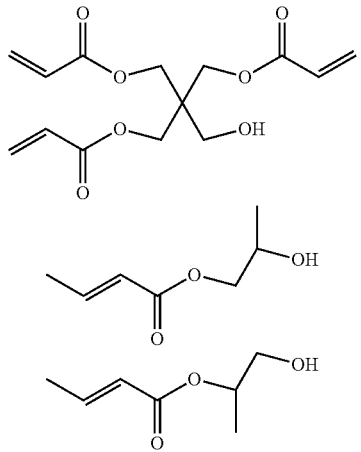

Examples of the polyol compound include tricyclodidecane dimethanol (TCDDM) represented by formula below.

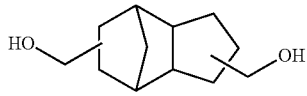

Preferred specific examples of the above-described urethane acrylate polymer include: a polymer of dicyclohexylmethane diisocyanate (H12MDI) and pentaerythritol triacrylate (PETA); a polymer of isophorone diisocyanate (IPDI) and PETA; a polymer of tricyclodidecane dimethanol (TCDDM), IPDI and PETA; a polymer of TCDDM, H12MDI and PETA; and a polymer of xylylene diisocyanate (XDI) and hydroxypropyl (meth)acrylate (HPA).

<(Meth)acrylate of Resin Material of Low-Refractive-Index Layer>

As the (meth)acrylate included in the resin material of the low-refractive-index layer, the same compounds as those for the (meth)acrylate included in the above-described resin material, i.e., the resin material of the high-refractive-index layer, can be employed.

For example, as the (meth)acrylate forming the low-refractive-index layer, a substituted or unsubstituted compound having 4 to 20 carbon atoms including at least one (meth)acryloyloxy group and at least one vinyl ether group is used. The carbon number of the (meth)acrylate is preferably 6 to 18, and more preferably 8 to 16. Examples of substituents of the (meth)acrylate include an alkyl group.

As the (meth)acrylate, for example, 2-(2-vinyloxyethoxy) ethyl (meth)acrylate (VEEA) is used.

In the resin material of the low-refractive-index layer, the ratio between the fluorine-containing urethane acrylate and the (meth)acrylate is preferably 99:1 to 30:70 (weight ratio), more preferably 97:3 to 60:40, even more preferably 95:5 to 80:20, and particularly preferably 90:10 to 50:50.

The value of the refractive index of the low-refractive-index layer is lower than the value of the refractive index of the base material layer. The refractive index of the low-refractive-index layer is preferably 1.31 to 1.40, more preferably 1.32 to 1.39, and even more preferably about 1.33 to 1.38.

Further, the difference between the refractive index of the low-refractive-index layer and the refractive index of the base material layer is preferably at least 0.09, more preferably at least 0.12, even more preferably at least 0.15, and particularly preferably at least 0.17. By increasing the difference between the value of the refractive index of the low-refractive-index layer and the value of the refractive index of the base material layer as described above, the reflectivity of the surface at the low-refractive-index layer side of the anti-reflection film can be increased.

<Low-Refractive-Index Member>

The low-refractive-index layer preferably includes a low-refractive-index member. The low-refractive-index member is added in order to reduce the refractive index of the low-refractive-index layer. Specifically, by forming the low-refractive-index layer using the low-refractive-index member, the difference between the refractive index of the low-refractive-index member and the refractive index of the base material layer can be increased and the reflectivity of the anti-reflection film can be reduced more.

As the low-refractive-index member, silica, a metal fluoride particle, etc. are preferred, and silica, in particular, a hollow silica is more preferred. In the case of using the metal fluoride particle, examples of the metal fluoride included in the particle include magnesium fluoride, aluminum fluoride, calcium fluoride and lithium fluoride.

The low-refractive-index member is preferably a particulate member. The particle size (diameter: average particle size) of the particulate low-refractive-index member is not particularly limited, but it is, for example, 10 to 200 nm, preferably 30 to 100 nm, more preferably 35 to 80 nm, and particularly preferably 45 to 65 nm.

<Other Components>

The low-refractive-index layer or the resin material forming the low-refractive-index layer preferably includes at least one of a photoinitiator (photopolymerization initiator) and a leveling agent, and particularly preferably includes a photoinitiator. In addition, the resin material of the low-refractive-index layer may include a solvent. Examples of the leveling agent include a fluorine-based leveling agent and a silicone-based leveling agent.

The low-refractive-index layer includes the resin material of the low-refractive-index layer and the low-refractive-index member at a weight ratio of preferably 20:80 to 70:30, more preferably 30:70 to 65:35, and even more preferably 35:65 to 60:40.

The thickness of the low-refractive-index layer is not particularly limited, but it is preferably 10 to 200 nm, more preferably 30 to 160 nm, even more preferably 50 to 120 nm, and particularly preferably 80 to 110 nm.

[Additional Layer (Layer Other than Base Material Layer and Anti-Reflection Layer: Another Layer)]

In the anti-reflection film, a layer other than the base material layer and the anti-reflection layer (the high-refractive-index layer and the low-refractive-index layer) (additional layer) may be layered. For example, in the anti-reflection film, another layer may be provided between the base material layer and the high-refractive-index layer, between the base material layer and the low-refractive-index layer, or between the high-refractive-index layer and the low-refractive-index layer.

The thickness of said another layer (additional layer) is not particularly limited, but it is preferably 0.1 to 10 μm, and more preferably 0.5 to 5 μm.

The anti-reflection film may further have a hard coat layer as the above-described another layer (additional layer). By providing the hard coat layer, the surface hardness of the anti-reflection film is improved.

The hard coat layer is preferably layered between the base material layer and the high-refractive-index layer.

Further, in the anti-reflection film having a layered structure including the low-refractive-index layer, the high-refractive-index layer and the hard coat layer, the hard coat layer is preferably layered between the base material layer and the high-refractive-index layer. That is, in the anti-reflection film that is a layered body further including the low-refractive-index layer and the hard coat layer in addition to the base material layer and the high-refractive-index layer, it is preferred that the base material layer, the hard coat layer, the high-refractive-index layer and the low-refractive-index layer are layered in this order.

The anti-reflection film having such a layered structure realizes high anti-reflection effects and improves the surface hardness, i.e., the hardness of the surface on the opposite side of the base material layer.

The hard coat layer is preferably formed by a hard coat treatment that is provided on the surface of the base material layer or the like. Specifically, it is preferred that a hard coat material that can be thermally cured or cured by active energy ray is applied and then cured, thereby layering the hard coat layer.

Examples of coating materials that are cured by active energy ray include a resin composition consisting of a monofunctional or polyfunctional acrylate monomer or oligomer alone or a plurality of such materials, and more preferred examples thereof include a resin composition including a urethane acrylate oligomer. A photopolymerization initiator as a curing catalyst is preferably added to these resin compositions.

Further, examples of thermosetting resin coating materials include a polyorganosiloxane-based material and a crosslinked acrylic material. Some of such resin compositions are commercially available as hard coat agents for acrylic resins or polycarbonate resins, and such materials may be suitably selected in consideration of suitability for a coating line.

To these coating materials, an organic solvent, various stabilizers such as an ultraviolet absorber, a light stabilizer and an antioxidant, surfactants such as a leveling agent, a defoaming agent, a thickening agent, an antistatic agent and an antifog additive, etc. may be suitably added according to need.

Examples of hard coat coating materials which are cured by active energy ray include a product obtained by adding 1 to 10 parts by weight of a photopolymerization initiator to 100 parts by weight of a photopolymerizable resin composition that is obtained by mixing about 40 to 95% by weight of a hexafunctional urethane acrylate oligomer and about 5 to 60% by weight of a (meth)acrylate such as 2-(2-vinyloxyethoxy)ethyl (meth)acrylate [2-(2-vinyloxyethoxy)ethyl acrylate: VEEA].

Further, as the above-described photopolymerization initiator, generally known materials can be used. Specific examples thereof include benzoin, benzophenone, benzoin ethyl ether, benzoin isopropyl ether, 2,2-dimethoxy-2-phenylacetophenone, 1-hydroxycyclohexyl phenyl ketone, 2-hydroxy-2-methyl-1-phenylpropane-1-one, azobisisobutyronitrile and benzoyl peroxide.

It is preferred that the refractive index of the hard coat layer is nearly equal to the refractive index of the base material layer. Specifically, the hard coat layer preferably has a refractive index of 1.49 to 1.65. The refractive index of the hard coat layer is more preferably 1.49 to 1.60, even more preferably 1.51 to 1.60, and particularly preferably about 1.53 to 1.59.

Further, the difference between the refractive index of the base material layer and the refractive index of the hard coat layer is preferably 0.04 or less, more preferably 0.03 or less, and even more preferably 0.02 or less.

The thickness of the hard coat layer is not particularly limited, but it is preferably 1 to 10 μm, more preferably 2 to 8 μm, and even more preferably about 3 to 7 μm.

[Characteristics of Anti-Reflection Film]

<Reflectivity>

The value of the reflectivity on the surface of the outer side of the anti-reflection film, i.e., the surface of the low-refractive-index layer which is opposite to the base material layer, which is measured under conditions of JIS Z 8722 2009, is preferably 2.0% or less, more preferably 1.8% or less, and even more preferably 1.5% or less.

<Pencil Hardness>

The surface of the anti-reflection layer side of the anti-reflection film preferably has high hardness. Specifically, for example, on the surface of the opposite side of the base material layer of the low-refractive-index layer side, the pencil hardness defined by JIS K-5400 is preferably 3B or harder, more preferably 2B or harder, even more preferably F or harder, and particularly preferably 2H or harder.

<Abrasion Resistance>

The surface of the low-refractive-index layer side of the anti-reflection film preferably has excellent abrasion resistance. Specifically, it is preferred that when a medical nonwoven fabric RP cross gauze No. 4 (manufactured by Osaki Medical Corporation) is shuttled on the surface of the low-refractive-index layer side of each film in the Examples 10 times while applying a load of 250 g/cm$^2$ to the nonwoven fabric, no scratch which can be visually recognized is generated.

<Thermoformability (Molding Processability Including Deep Drawability and Right Angle Shape-Imparting Characteristics)>

When a pressure formed body in which the value of the radius R is sufficiently small is obtained, it means that the anti-reflection film is easily formed in a manner such that it is formed along a right angle area of a mold and has excellent deep drawability and right angle shape-imparting characteristics.

<Conditions of Film Surface>

Regarding the anti-reflection film, it is preferred that conditions of the surfaces, in particular, the surface of the low-refractive-index layer side are satisfactory. Specifically, it is preferred that even after the process of applying, drying and curing the resin material for forming the low-refractive-index layer, none of crack, whitening, foaming and unevenness (mainly color unevenness) is observed on the surface of the anti-reflection film and that it can be said that the surface of the obtained anti-reflection film has good outer appearance.

<Elongation Rate>

The anti-reflection film is also excellent in the elongation rate at the time of forming. Specifically, as in the case of evaluation of thermoformability, when the polycarbonate resin side of the sample obtained by cutting into a size of 210 mm×297 mm×0.3 mm (thickness) is preheated at 190° C. for 40 seconds, the sample is placed in a mold having a right angle-shaped projection having a deep drawing height of 1 mm or more and a size of 30 mm×30 mm in a manner such that the base material layer is in contact with the mold, and the sample is subjected to pressure forming using high pressure air of 1.5 MPa, in an area in which a pressure formed body obtained is in contact with the right angle-shaped projection of the mold, the value of the elongation rate calculated as described below is preferably high.

Specifically, on the surface of the sample of the anti-reflection film, grid-like lines at predetermined intervals (e.g., 1 mm) were printed, and based on the matter as to how much an interval between predetermined grid-like lines is increased after pressure forming when compared to the interval prior to pressure forming, the value of the elongation rate is calculated according to formula (A) below.

(Interval between grid-like lines after pressure forming (mm)−Interval between grid-like lines before pressure forming (mm))/Interval between grid-like lines before pressure forming (mm)×100(%)  formula (A)

It can be said that the above-described formula (A) is equivalent to the following formula: (Length between predetermined two points after pressure forming−Length between the predetermined two points before pressure forming)/Length between the predetermined two points before pressure forming×100(%)

Using the above-described formula (A), the elongation rate (%) of an area after the anti-reflection film prior to pressure forming is placed in a manner such that it covers the right angle-shaped portion having a deep drawing height of 1 mm or more and pressure forming is performed can be calculated. As exemplified in FIG. 3, when grid-like lines at 1 mm intervals are printed on the surface of the anti-reflection film prior to pressure forming and an interval between grid-like lines in a predetermined area after pressure forming, for example, in an area surrounded by a rhomboidal shape in FIG. 3, is 2 mm, based on the above-described formula (A), the elongation rate is calculated as follows: (2 (mm)−1 (mm))/1 (mm)×100=100(%)

It is preferred that the anti-reflection film can be formed in a manner such that the value of the elongation rate calculated based on the above-described formula (A) becomes sufficiently high.

For example, regarding a sample of the anti-reflection film obtained by being cut into a size of 210 mm×297 mm×0.3 mm (thickness), when the base material layer is preheated at 190° C. for 40 seconds, the sample is placed in a mold having a right angle-shaped projection having a deep drawing height of 1 mm to 5 mm and a size of 30 mm×30 mm in a manner such that the base material layer is in contact with the mold, and the sample is subjected to pressure forming using high pressure air of 1.5 MPa, in an area in which a pressure formed body obtained is in contact with the right angle-shaped portion of the mold, the value of the elongation rate (%) that is calculated based on formula (A) is preferably equal to or more than a value of the deep drawing height (mm) of the mold×10, and more preferably equal to or more than a value of the deep drawing height (mm) of the mold×14.

More specifically, when using the anti-reflection film in the Examples, after it is placed in a manner such that it covers the right angle-shaped portion of the mold having a deep drawing height of 1 mm and pressure forming is performed, the elongation rate of 10(%) or more, or 14(%) or more can be realized. Further, when the anti-reflection film in the Examples is placed in a manner such that it covers the right angle-shaped portion (projection) of the mold having a deep drawing height of 3 mm and pressure forming is performed, the elongation rate of 30(%) or more, or 42(%) or more can be realized. Similarly, when the deep drawing height of the right angle-shaped portion of the mold is 7 mm, the elongation rate of at least 70%, or about 100% (98%) can be achieved.

[Layered Product Film]

The layered product film of the present invention has a transparent resin base material and the above-described anti-reflection film. As the transparent resin base material, for example, a product obtained by layering a methacrylic resin layer on a layer of a polycarbonate of bisphenol A, a product obtained by layering a layer of a polycarbonate of bisphenol C on a layer of a polycarbonate of bisphenol A or the like is used. The thickness of the transparent resin base material is not particularly limited, but it is preferably 30 μm to 1000 μm (1 mm), more preferably 50 μm to 700 μm, and even more preferably 100 μm to 500 μm.

Examples of the layered product film include films to be laminated on surfaces of a computer screen, a television screen, a plasma display panel, etc., and films to be used for surfaces of a polarizing plate to be used for a liquid crystal display, a sunglass lens, a prescription glass lens, a finder lens for a camera, a cover for various instruments, glass of automobiles, glass of trains, a display panel for a vehicle, an electronic equipment casing, etc.

[Method for Producing Anti-Reflection Film and Layered Product Film]

In the production of the anti-reflection film, firstly, the base material layer is preferably formed. In the production of the base material layer, a material such as a resin composition is processed to form a layer shape (sheet shape) using a conventional technique. Examples thereof include methods using extrusion molding or cast molding. For example, in a method using extrusion molding, the resin composition of the present invention in the form of pellet, flake or powder is melted and kneaded by an extruder and then extruded from a T-die or the like, and a sheet in a semi-melted state obtained is cooled and solidified while being compressed by rolls, thereby forming a sheet.

Further, a resin material is applied to outer surfaces of one or a plurality of base material layers, followed by curing, thereby forming a low-refractive-index layer. As a technique of curing the resin material, photocuring, thermal curing or the like can be employed.

By further layering a transparent resin base material on the anti-reflection film thus produced using a publicly-known technique, a layered product film is produced.

EXAMPLES

Hereinafter, the present invention will be described in more detail by way of examples. However, the present invention is not limited to the below-described examples, and can be arbitrarily changed and then carried out without departing from the gist of the present invention.

Synthesis Example

According to a production method similar to that in Synthesis Example 2 of Japanese Patent No. 6078258, a polycarbonate of a copolymer in which 2,2-bis(4-hydroxy-3-methylphenyl)propane/2,2-bis(4-hydroxyphenyl)propane-6/4 (weight ratio) was produced.

<Transparent Base Material Layer>

A first polycarbonate resin layer 20 having a thickness of 60 μm made of the copolymer of 2,2-bis(4-hydroxy-3-methylphenyl)propane (bisphenol C) and 2,2-bis(4-hydroxyphenyl)propane (bisphenol A) synthesized as described above and a polycarbonate resin 22 having a thickness of 240 µm made of a polymer of 2,2-bis(4-hydroxyphenyl)propane (bisphenol A) (lupilon S-2000 (manufactured by Mitsubishi Engineering-Plastics Corporation)) were layered by a coextrusion method to form a transparent base material layer having a total thickness of 300 µm (see FIG. 1).

The coextrusion method is as described below. The above-described bisphenol C was continuously introduced into a single screw extruder having a shaft diameter of 40 mm and extruded at a cylinder temperature of 240° C. Further, the above-described bisphenol A was continuously introduced into a single screw extruder having a shaft diameter of 75 mm and extruded at a cylinder temperature of 270° C. The resins extruded by the respective extruders were layered in a multi-manifold and extruded from a T-die to be formed into a sheet-like shape, and using 3 mirror-finished rolls each at 130° C., 130° C. and 185° C. from the upstream side, it was transferred on the mirror surfaces to be cooled, thereby obtaining a layered product of bisphenol C and bisphenol A.

In the base material layer thus obtained, the value of the refractive index of the first polycarbonate resin layer was 1.577, and the value of the refractive index of the second polycarbonate resin layer was 1.584.

<High-Refractive-Index Coating Material>

Next, for forming a high-refractive-index layer, a curable high-refractive-index coating material was prepared in the below-described manner.

Firstly, in a 3 L five-neck flask equipped with a stirring machine, a thermometer, a cooler, a dropping funnel and a dry air introduction tube, dry air was flowed in advance to dry the system. Further, in the five-neck flask, 553 parts by weight of 9,9-bis[4-(2-hydroxyethoxy)phenyl]fluorene (TBIS-G manufactured by Taoka Chemical Co., Ltd.), 592 parts by weight of 2-hydroxy-3-phenoxypropyl acrylate (M-600A manufactured by Kyoeisha Chemical Co., Ltd.), 1.5 parts by weight of dibutyltin laurate as a polymerization catalyst, 3 parts by weight of 2,6-tert-butyl-4-methylphenol (BHT) and 1500 parts by weight of methyl ethyl ketone as a solvent were put, the materials were homogeneously mixed, and the temperature was raised to 60° C. After that, 448 parts by weight of xylene diisocyanate (XDI manufactured by Mitsui Chemicals, Inc.) was put in the reaction system, and then a reaction was performed at 70° C. After it was confirmed by infrared absorption spectrum that isocyanate residues in a reaction product were consumed, the reaction was terminated, thereby obtaining a difunctional urethane acrylate oligomer.

Hereinafter, the difunctional urethane acrylate oligomer for the high-refractive-index layer thus obtained is referred to as the first urethane acrylate solution.

Next, a urethane acrylate oligomer for the high-refractive-index layer that is different from the first urethane acrylate oligomer was prepared in the below-described manner.

Firstly, in a 3 L five-neck flask equipped with a stirring machine, a thermometer, a cooler, a dropping funnel and a dry air introduction tube, dry air was flowed in advance to dry the system. Further, in the five-neck flask, 467 parts by weight of 9,9-bis[4-(2-hydroxyethoxy)phenyl]fluorene (TBIS-G manufactured by Taoka Chemical Co., Ltd.), 945 parts by weight of pentaerythritol triacrylate (PE-3A manufactured by Kyoeisha Chemical Co., Ltd.), 1.5 parts by weight of dibutyltin laurate as a polymerization catalyst, 3 parts by weight of 2,6-tert-butyl-4-methylphenol (BHT) and 1200 parts by weight of methyl ethyl ketone as a solvent were put, the materials were homogeneously mixed, and the temperature was raised to 60° C. After that, 395 parts by weight of xylene diisocyanate (XDI manufactured by Mitsui Chemicals, Inc.) was put in the reaction system, and then a reaction was performed at 70° C. After it was confirmed by infrared absorption spectrum that isocyanate residues in a reaction product were consumed, the reaction was terminated, thereby obtaining a difunctional urethane acrylate oligomer.

Hereinafter, the difunctional urethane acrylate oligomer for the high-refractive-index layer thus obtained is referred to as the second urethane acrylate solution.

With each of the above-described first and second urethane acrylate solutions, ethoxylated (4 mol) bisphenol A diacrylate (A-BPE-4 manufactured by Shin-Nakamura Chemical Co., Ltd.) was mixed at a ratio of urethane acrylate solution/bisphenol A diacrylate=90/10 (wt %). To each of the first and second resin materials thus obtained, zirconia particles (manufactured by Nippon Shokubai Co., Ltd.) were added (mixing at a ratio of resin material/zirconia=20/80 (wt %)). The zirconia particles used had an organic layer coating on the surface thereof and had a particle diameter (average particle diameter) of about 20 nm, and the particle diameter of zirconia serving as a core was about 11 nm.

In addition, 5% by weight of 1-hydroxy-cyclohexyl-phenyl-ketone as a photoinitiator (I-184 manufactured by BASF) was dissolved in each of the first and second resin materials containing zirconia, and a solvent (propylene glycol monomethyl ether) was added thereto to adjust the concentration so that the solid content became 7% by weight.

The obtained first high-refractive-index coating material (zirconia-containing resin material) is referred to as A-1, and the obtained second high-refractive-index coating material (zirconia-containing resin material) is referred to as A-2.

The refractive index of the resin material (monomer) of A-1 was 1.5667, and the refractive index after the addition of zirconia was 1.7213. Further, the refractive index of the resin material (monomer) of A-2 was 1.5460, and the refractive index after the addition of zirconia was 1.7172.

Further, with each of the above-described first and second urethane acrylate solutions, 2-(2-vinyloxyethoxy)ethyl acrylate (VEEA) was mixed at a ratio of urethane acrylate solution/VEEA=90/10 (wt %). To each of the third and fourth resin materials thus obtained, zirconia (manufactured by Nippon Shokubai Co., Ltd.) was added (mixing at a ratio of resin material/zirconia=20/80 (wt %)). In addition, 5% by weight of 1-hydroxy-cyclohexyl-phenyl-ketone as a photoinitiator (I-184 manufactured by BASF) was dissolved in each of the third and fourth resin materials containing zirconia, and a solvent (propylene glycol monomethyl ether) was added thereto to adjust the concentration so that the solid content became 7% by weight.

The obtained third high-refractive-index coating material (zirconia-containing resin material) is referred to as A-3, and the obtained fourth high-refractive-index coating material (zirconia-containing resin material) is referred to as A-4.

The refractive index of the resin material (monomer) of A-3 was 1.5580, and the refractive index after the addition of zirconia was 1.7196. Further, the refractive index of the resin material (monomer) of A-4 was 1.5373, and the refractive index after the addition of zirconia was 1.7155.

<Low-Refractive-Index Coating Material>

Next, for forming a low-refractive-index layer, a curable low-refractive-index coating material was prepared in the below-described manner.

Firstly, in a five-neck flask equipped with a stirring machine, a thermometer, a cooler, a monomer dropping funnel and a dry air introduction tube, dry air was flowed in advance to dry the system. Further, in the five-neck flask, 58.9 parts by weight of 2,2,3,3-tetrafluoro-1,4-butanediol (C4DIOL manufactured by Exfluor Research Corporation), 279.8 parts by weight of pentaerythritol triacrylate, 0.5 part by weight of dibutyltin laurate as a polymerization catalyst and 500 parts by weight of methyl ethyl ketone as a solvent were put, and the temperature was raised to 60° C. After that, 161.3 parts by weight of isophorone diisocyanate was put therein, and then a reaction was performed at 60 to 70° C. After it was confirmed by infrared absorption spectrum that isocyanate residues in a reaction product were consumed, the reaction was terminated, thereby obtaining a hexafunctional urethane acrylate oligomer.

Further, 2-(2-vinyloxyethoxy)ethyl acrylate (VEEA) was mixed with the urethane acrylate oligomer (urethane acrylate solution) at a ratio of urethane acrylate solution/VEEA=90/10 (wt %).

To the liquid component of the resin material thus obtained, a hollow silica (THRULYA 4320 manufactured by JGC Catalysts and Chemicals Ltd.) was added, and mixing was carried out at a ratio of resin material/hollow silica=35/65 (wt %). Further, 5% by weight of 1-hydroxy-cyclohexyl-phenyl-ketone as a photoinitiator (I-184 manufactured by BASF) and 1% by weight of a leveling agent RS-78 (manufactured by DIC: the solid content as the leveling agent was 40% by weight, and it was diluted with a solvent MEK) were added thereto and dissolved therein, and a solvent (propylene glycol monomethyl ether) was added thereto to adjust the concentration so that the solid content became 1.5% by weight.

The low-refractive-index coating material thus obtained is referred to as the low-refractive-index coating material B.

Note that the refractive index of the resin material of the low-refractive-index coating material, that is, prior to the addition of the hollow silica was 1.486, and the value of the refractive index of the low-refractive-index coating material B after the addition of the hollow silica was 1.3651.

Example 1

The above-described high-refractive-index coating material A-1 was applied on the first polycarbonate resin layer of the transparent base material layer in a manner such that a dried coating film had a thickness of 150 nm, and drying was carried out at 100° C. for 2 minutes. Then ultraviolet irradiation was carried out using an ultraviolet curing device in a manner such that the integrated light quantity became 500 mJ/cm$^2$. Next, on the layer of the high-refractive-index coating material A-1, the low-refractive-index coating material B was applied in a manner such that a dried coating film had a thickness of 100 nm, and drying was carried out at 100° C. for 2 minutes. Then ultraviolet irradiation was carried out using the ultraviolet curing device in a manner such that the integrated light quantity became 500 mJ/cm$^2$, thereby curing the low-refractive-index coating material B. In this way, a high-refractive-index layer 16 derived from the high-refractive-index coating material A-1 was formed on the outer surface of the first polycarbonate resin layer 20 (base material layer), and a low-refractive-index layer derived from the low-refractive-index coating material B was formed on the outer surface of the high-refractive-index layer 16 to form the outermost layer of the layered product, thereby producing an anti-reflection film 10A (see FIG. 1).

Example 2

An anti-reflection film was produced in a manner similar to that in Example 1, except that the high-refractive-index coating material A-2 was used instead of the high-refractive-index coating material A-1.

Example 3

An anti-reflection film was produced in a manner similar to that in Example 1, except that as the base material layer, a transparent base material layer, in which a methacrylic resin layer is layered on a polycarbonate resin layer made of 2,2-bis(4-hydroxyphenyl)propane (bisphenol A) (DF02 manufactured by MGC Filsheet Co., Ltd., total thickness: 300 μm), was used.

In the base material layer thus obtained, the value of the refractive index of the polycarbonate resin layer was 1.584, and the value of the refractive index of the methacrylic resin layer was 1.491.

Example 4

An anti-reflection film was produced in a manner similar to that in Example 3, except that the high-refractive-index coating material A-2 was used instead of the high-refractive-index coating material A-1.

Example 5

An anti-reflection film was produced in a manner similar to that in Example 1, except that as the base material layer, a transparent base material layer of a polycarbonate resin consisting of 2-bis(4-hydroxyphenyl)propane (bisphenol A) (NF-2000 manufactured by MGC Filsheet Co., Ltd., thickness: 300 μm) was used.

Note that the value of the refractive index of the polycarbonate resin layer as the base material layer was 1.584.

Example 6

An anti-reflection film was produced in a manner similar to that in Example 5, except that the high-refractive-index coating material A-2 was used instead of the high-refractive-index coating material A-1.

Examples 7-12

Anti-reflection films of Examples 7, 9 and 11 were produced in manners similar to those in Examples 1, 3 and 5, respectively, except that the high-refractive-index coating material A-3 was used instead of the high-refractive-index coating material A-1.

Further, anti-reflection films of Examples 8, 10 and 12 were produced in manners similar to those in Examples 2, 4 and 6, respectively, except that the high-refractive-index coating material A-4 was used instead of the high-refractive-index coating material A-2.

Comparative Example 1

As the base material layer, a transparent base material layer of a polycarbonate resin consisting of 2-bis(4-hydroxyphenyl)propane (bisphenol A) (FE-2000 manufactured by MGC Filsheet Co., Ltd., thickness: 300 μm) was used.

The value of the refractive index of the polycarbonate resin layer as the base material layer was 1.584.

Further, as a urethane acrylate solution, a commercially-available product different from the above-described high-refractive-index coating materials A-1 and A-2 was used. Specifically, CN-968 which does not contain a fluorene skeleton (aliphatic urethane hexaacrylate oligomer manufactured by Sartomer) was used as the urethane acrylate solution, and 2-(2-vinyloxyethoxy)ethyl acrylate (VEEA) was mixed with the urethane acrylate solution at a ratio of urethane acrylate solution/VEEA=90/10 (wt %). An anti-reflection film was produced in a manner similar to that in Example 1, except that the high-refractive-index coating material C-1 thus obtained was used.

Physical properties of the anti-reflection films of Examples 1-6, etc. thus produced were measured in the below-described manners.

<Measurement of Physical Properties>

Adhesion:

On a cured film, 11 cuts at 1 mm intervals were made vertically and horizontally respectively by a cutter to provide 100 squares, and Sellotape (registered trademark) (adhesive tape manufactured by NICHIBAN Co., Ltd.) was attached on the squares and then peeled off at once in the direction of 90°. The number of squares where the cured film was not removed (remained) was counted.

Further, the condition where the coated film remained in all the squares was evaluated as "good", and the condition where the coated film was removed from at least a part of the square was evaluated as "poor".

Pencil Hardness:

The measurement was carried out based on the conditions of JIS K-5400 and evaluation was made based on the grade of the hardest pencil by which no scratch was made.

Abrasion Resistance:

A medical nonwoven fabric RP cross gauze No. 4 (manufactured by Osaki Medical Corporation) was shuttled 10 times on the surface of the low-refractive-index layer side of each film in the Examples while applying a load of 250 g/cm$^2$ to the nonwoven fabric, and the condition regarding scratch was visually judged.

Refractive Index:

In accordance with JIS K0062-1992, using an Abbe refractometer (model: NAR-1T LIQUID) manufactured by Atago Co., Ltd., the value (nD) of the refractive index was measured with a D-line at a wavelength of 589 nm at 25° C. Regarding the solution including the solvent, the refractive index was measured in the state where the solvent was included, and from the measured value and the dilution ratio of the solvent, the value of the refractive index of the solution from which the solvent was removed was calculated.

Reflectivity (Luminous Reflectance):

The measurement was carried out in accordance with JIS Z 8722-2009 using SD6000 manufactured by Nippon Denshoku Industries Co., Ltd. In the measurement of reflectivity, a black vinyl tape was applied on the surface opposite to the coated surface in order to prevent reflection from the back surface (base material layer side) of each film in the Examples. Specifically, the reflectivity was measured using SCI (Specular Component Include) mode in which specularly reflected light and diffuse reflected light were combinedly measured under a D65 light source. Using the reflectivity measured in this way, the luminous reflectance that is a stimulus value Y of reflection defined in JIS Z8701 was calculated.

Abrasion Resistance and Thermoformability (Molding Processability Including Deep Drawability and Right Angle Shape-Imparting Characteristics):

Each anti-reflection film obtained in the Examples was cut into a size of 210 mm×297 mm×0.3 mm (thickness), and the polycarbonate resin side of the obtained sample was preheated at 190° C. for about 40 seconds. Immediately after that, with high pressure air of 1.5 MPa, pressure forming was carried out using a mold having a right angle-shaped projection with a deep drawing height. Note that the deep drawing height in the right angle-shaped mold was set to 1 mm, 2 mm and 5 mm or more (1 mm intervals). Further, the value of the radius R of an area in which a pressure formed body that was obtained by pressure forming using a mold having a right angle-shaped projection having a deep drawing height of 1 mm or more and a size of 30 mm×30 mm was in contact with the right angle-shaped portion of the mold was measured, and it was described as "right angle shape radius R (mm)" in Table 1 below. It can be said that the smaller the value is, the more excellent the formability is.

The radius R of the right angle-shaped portion was measured using a contact-type contour shape measurement apparatus CONTOURECORD2700/503 (manufactured by Tokyo Seimitsu Co., Ltd.).

In addition, surface conditions (crack, whitening, foaming and unevenness) of the formed body obtained were observed, and when none of crack, whitening, foaming and unevenness was observed, the abrasion resistance was evaluated as "no scratch". Further, the case where a formed body having a deep drawing height of 1 mm or more and a radius R of the right angle-shaped portion of 3.0 mm or less was successfully formed without scratch was comprehensively evaluated as "good" thermoformability. The deep drawing height of the formed body obtained by thermoforming, that is, the height from the base plane of the film as the formed body to the area formed in the convex portion (projection) of the mold was actually measured as a value of the "deep drawing height (mm)".

The above-described pressure forming was carried out by the below-described technique. Firstly, the above-described sample of the anti-reflection film was fixed by a holder, and the sample was moved to a heating zone together with the holder and subjected to infrared irradiation from above to be heated to a temperature higher than Tg of the sample sheet, thereby carrying out softening. Further, the sample sheet was removed onto a mold together with the holder, mold clamping was carried out, and at the same time, pressurized air was introduced. Then the sample sheet was rapidly elongated until it contacted with the mold surface, and after that, it was rapidly cooled to a temperature that is equal to or lower than Tg of the resin of the sample sheet while being contacted with the mold surface, thereby obtaining a shaped product fixed along the mold surface shape. After pressurized air and the like were discharged, the shaped product was taken out, and characteristics thereof were measured according to the above-described methods.

Elongation Rate:

On the surface of the above-described sample of the anti-reflection film prior to pressure forming, grid-like lines at predetermined intervals were printed. Further, based on the result showing how much an interval between lines adjacent to each other on the sample was increased after pressure forming, the elongation rate was calculated according to formula (A) above, and it was 28 to 42%.

The measurement results regarding the characteristics of the films of Examples 1-12, etc. were as described in Table 1. The refractive index in the table is a value of the coating material prior to polymerization of each layer, and in all the layers, the value of the refractive index after polymerization was about 0.02 larger than the value of the coating material prior to polymerization.

TABLE 1

|  |  | Example 1 | Example 2 | Example 3 | Example 4 | Example 5 |
|---|---|---|---|---|---|---|
| Layered product | High-refractive-index layer (refractive index) | A-1 (1.7213) | A-2 (1.7172) | A-1 (1.7213) | A-2 (1.7172) | A-1 (1.7213) |
|  | Low-refractive-index layer (refractive index) | B (1.3651) | B (1.3651) | B (1.3651) | B (1.3651) | B (1.3651) |
|  | Base material layer (refractive index) | 2 PC resin layers (1.577/1.584) | 2 PC resin layers (1.577/1.584) | PC resin layer/methacrylic resin layers (1.584/1.491) | PC resin layer/methacrylic resin layers (1.584/1.491) | PC resin single layer (1.584) |
| Evaluation items | Adhesion | Good | Good | Good | Good | Good |
|  | Pencil hardness | 2H | 2H | H | H | B |
|  | Abrasion resistance | No scratch | No scratch | No scratch | No scratch | No scratch |
|  | Right angle shape radius R (mm) | 1 | 1 | 1 | 1 | 1 |
|  | Deep drawing height (mm) | 3 | 3 | 4 | 2 | 3 |
|  | Elongation rate (%) | 42 | 42 | 28 | 28 | 42 |
|  | Luminous reflectance (%) | 1.1 | 1.1 | 1.2 | 1.2 | 0.9 |

|  |  | Example 6 | Example 7 | Example 8 | Example 9 | Example 10 |
|---|---|---|---|---|---|---|
| Layered product | High-refractive-index layer (refractive index) | A-2 (1.7172) | A-3 (1.7196) | A-4 (1.7155) | A-3 (1.7196) | A-4 (1.7155) |
|  | Low-refractive-index layer (refractive index) | B (1.3651) | B (1.3651) | B (1.3651) | B (1.3651) | B (1.3651) |
|  | Base material layer (refractive index) | PC resin single layer (1.584) | 2 PC resin layers (1.577/1.584) | 2 PC resin layers (1.577/1.584) | PC resin layer/methacrylic resin layer (1.584/1.491) | PC resin layer/methacrylic resin layer (1.584/1.491) |
| Evaluation items | Adhesion | Good | Good | Good | Good | Good |
|  | Pencil hardness | B | 2H | 2H | H | H |
|  | Abrasion resistance | No scratch | No scratch | No scratch | No scratch | No scratch |
|  | Right angle shape radius R (mm) | 1 | 1 | 1 | 1 | 1 |
|  | Deep drawing height (mm) | 3 | 3 | 3 | 2 | 2 |
|  | Elongation rate (%) | 42 | 42 | 42 | 28 | 28 |
|  | Luminous reflectance (%) | 0.9 | 1.2 | 1.2 | 1.2 | 1.2 |

|  |  | Example 11 | Example 12 | Comparative Example 1 |
|---|---|---|---|---|
| Layered product | High-refractive-index layer (refractive index) | A-3 (1.7196) | A-4 (1.7155) | C-1 (1.7063) |
|  | Low-refractive-index layer (refractive index) | B (1.3651) | B (1.3651) | B (1.3651) |
|  | Base material layer (refractive index) | PC resin single layer (1.584) | PC resin single layer (1.584) | PC resin single layer (1.584) |
| Evaluation items | Adhesion | Good | Goud | Good |
|  | Pencil hardness | B | B | B |
|  | Abrasion resistance | No scratch | No scratch | Scratch is present |
|  | Right angle shape radius R (mm) | 1 | 1 | Crack was generated |
|  | Deep drawing height (mm) | 3 | 3 |  |
|  | Elongation rate (%) | 42 | 42 |  |
|  | Luminous reflectance (%) | 1.0 | 1.0 | 1.1 |

Thus, it was confirmed that the anti-reflection films in the Examples have not only high adhesion between layers, satisfactory abrasion resistance and high surface hardness, but also excellent thermoformability and low surface reflectivity.

Further, even when an additional layer (another layer) 18 such as a hard coat layer is formed unlike Examples 1-6, an anti-reflection film 10B having excellent characteristics can be obtained (see FIG. 2).

DESCRIPTION OF REFERENCE NUMERALS

10A, 10B anti-reflection film
12 low-refractive-index layer
16 high-refractive-index layer
18 additional layer (another layer)
20 first polycarbonate resin layer (base material layer)
22 second polycarbonate resin layer (base material layer)

The invention claimed is:

1. An anti-reflection film, which has:
a base material layer including a thermoplastic resin; and
a high-refractive-index layer, which is layered on at least one surface of the base material layer, and which has a refractive index that is higher than the refractive index of the base material layer, wherein
the high-refractive-index layer includes a polymer of a resin material that includes:
(a) a urethane (meth)acrylate derived from a fluorene-based diol, an isocyanate and a (meth)acrylate; and
(b) a (meth)acrylate,
wherein the anti-reflection film has a low-refractive-index layer having a refractive index that is lower than the refractive index of the base material layer, wherein the low-refractive-index layer is layered on the surface of the high-refractive-index layer and the surface is opposite to the base material layer, and
the base material layer has a refractive index of 1.49 to 1.65, the high-refractive-index layer has a refractive index of 1.68 to 1.75 and the low-refractive-index layer has a refractive index of 1.31 to 1.40.

2. The anti-reflection film according to claim 1, wherein the base material layer has a refractive index of 1.49 to 1.65 and the high-refractive-index layer has a refractive index of 1.68 to 1.75.

3. The anti-reflection film according to claim 1, wherein the urethane (meth)acrylate is represented by formula (I):

$$(A3)\text{-O(OC)HN-A2-HN(OC)}\text{—O-A1-O—(CO)NH-A2-NH—(CO)O-(A3)} \quad (I)$$

wherein:
A1 is a substituted or unsubstituted fluorene-based diol-derived alkylene group having a total carbon number of 8 to 60;
A2s are each independently a substituted or unsubstituted aromatic isocyanate-derived alkylene group having a total carbon number of 6 to 20; and
A3s are each independently a substituted or unsubstituted alkyl group having a total carbon number of 4 to 30 including at least one (meth)acryloyloxy group.

4. The anti-reflection film according to claim 3, wherein the urethane (meth)acrylate includes a compound represented by any one of formulae (II), (III), (IV) and (V):

(II)
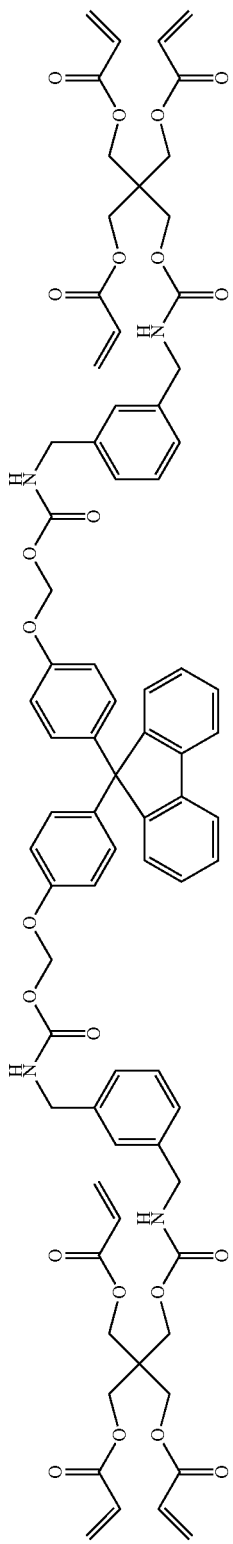
(III)
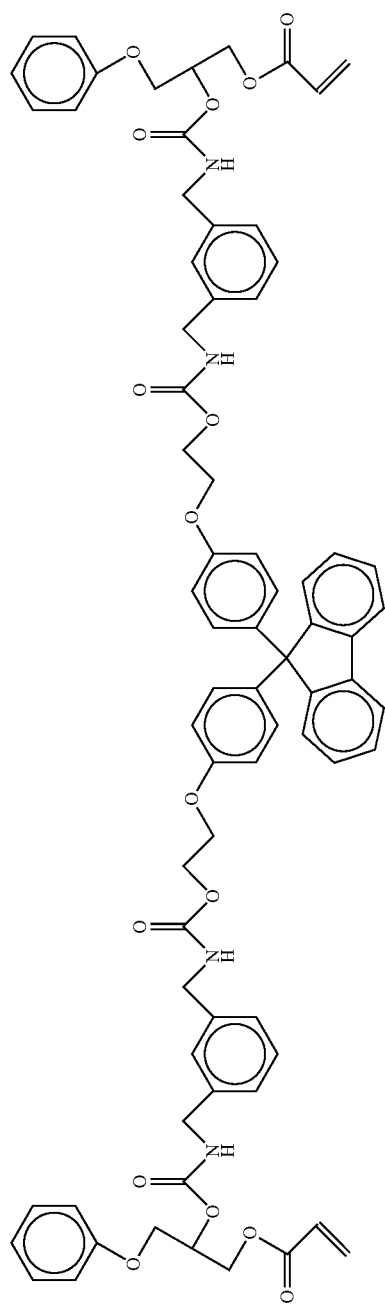

-continued
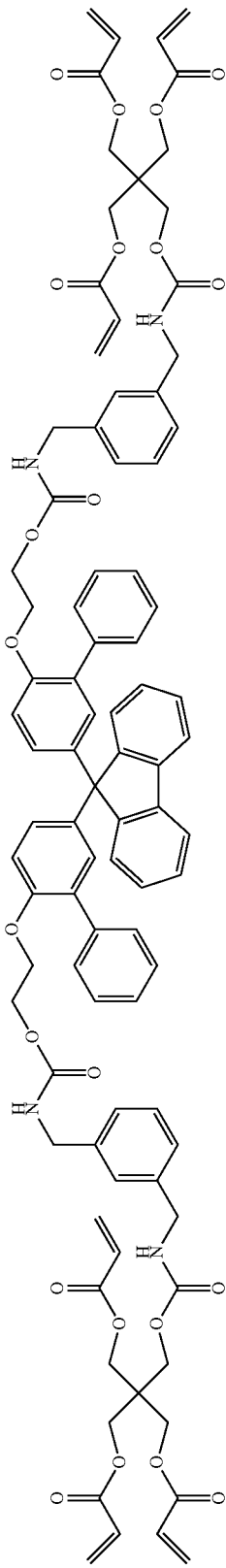
(IV)
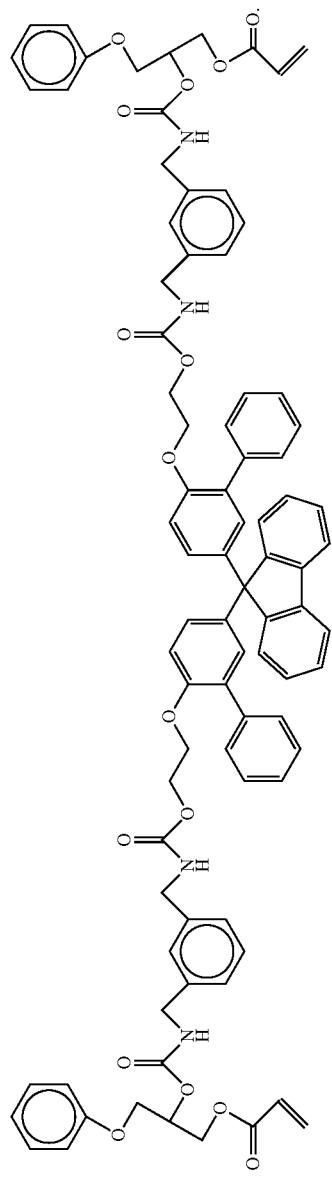
(V)

5. The anti-reflection film according to claim 1, wherein the (b) (meth)acrylate is a substituted or unsubstituted compound having 4 to 20 carbon atoms including at least one (meth)acryloyloxy group and at least one vinyl ether group.

6. The anti-reflection film according to claim 1, wherein the (b) (meth)acrylate is a bisphenol A di(meth)acrylate compound having an ethoxy group.

7. The anti-reflection film according to claim 1, wherein the high-refractive-index layer further includes a high-refractive-index member.

8. The anti-reflection film according to claim 7, wherein the high-refractive-index member includes zirconia.

9. The anti-reflection film according to claim 7, wherein the high-refractive-index layer includes the resin material and the high-refractive-index member at a weight ratio of 10:90 to 40:60.

10. The anti-reflection film according to claim 1, wherein the high-refractive-index layer includes a photoinitiator.

11. The anti-reflection film according to claim 1, wherein the resin material includes the urethane (meth)acrylate and the (meth)acrylate at a weight ratio of 99:1 to 50:50.

12. The anti-reflection film according to claim 1, which includes the base material layer whose number is 2 or more.

13. The anti-reflection film according to claim 1, wherein the base material layer has a thickness of 50 to 500 μm and the high-refractive-index layer has a thickness of 10 to 200 nm.

14. The anti-reflection film according to claim 1, wherein the base material layer has a thickness of 50 to 500 μm, the high-refractive-index layer has a thickness of 10 to 200 nm and the low-refractive-index layer has a thickness of 10 to 200 nm.

15. The anti-reflection film according to claim 1, wherein regarding a sample of the anti-reflection film obtained by being cut into a size of 210 mm×297 mm×0.3 mm (thickness), when the base material layer is preheated at 190° C. for 40 seconds, the sample is placed in a mold including a right angle-shaped projection having a deep drawing height of 1 mm or more and a size of 30 mm×30 mm in a manner such that the base material layer is in contact with the mold, and the sample is subjected to pressure forming using high pressure air of 1.5 MPa, the radius R of an area in which a pressure formed body obtained is in contact with the right angle-shaped portion of the mold is 3.0 mm or less.

16. An anti-reflection film, which has:
a base material layer including a thermoplastic resin; and
a high-refractive-index layer, which is layered on at least one surface of the base material layer, and which has a refractive index that is higher than the refractive index of the base material layer, wherein
regarding a sample of the anti-reflection film obtained by being cut into a size of 210 mm×297 mm×0.3 mm (thickness), when the base material layer is preheated at 190° C. for 40 seconds, the sample is placed in a mold including a right angle-shaped projection having a deep drawing height of 1 mm or more and a size of 30 mm×30 mm in a manner such that the base material layer is in contact with the mold, and the sample is subjected to pressure forming using high pressure air of 1.5 MPa, in an area in which a pressure formed body obtained is in contact with the right angle-shaped portion of the mold, an elongation rate (%) that is a value obtained by formula (A):

(Length between predetermined two points after pressure forming-Length between the predetermined two points before pressure forming)/Length between the predetermined two points before pressure forming×100(%)    (A)

is equal to or more than a value of the deep drawing height (mm) of the mold×10.

17. An anti-reflection film, which has:
a base material layer including a thermoplastic resin;
a high-refractive-index layer, which is layered on at least one surface of the base material layer, and which has a refractive index that is higher than the refractive index of the base material layer; and
a low-refractive-index layer, which has a refractive index that is lower than the refractive index of the base material layer, and which is layered on the surface of the high-refractive-index layer and the surface is opposite to the base material layer, wherein
a value of the reflectivity on the surface of the low-refractive-index layer side measured under conditions of JIS Z 8722-2009 is 2.0% or less, and wherein
regarding a sample of the anti-reflection film obtained by being cut into a size of 210 mm×297 mm×0.3 mm (thickness), when the base material layer is preheated at 190° C. for 40 seconds, the sample is placed in a mold including a right angle-shaped projection having a deep drawing height of 1 mm or more and a size of 30 mm×30 mm in a manner such that the base material layer is in contact with the mold, and the sample is subjected to pressure forming using high pressure air of 1.5 MPa, the radius R of an area in which a pressure formed body obtained is in contact with the right angle-shaped portion of the mold is 3.0 mm or less.

18. A layered product film having a transparent resin base material and the anti-reflection film according to claim 1.

19. An anti-reflection film, which has:
a base material layer including a thermoplastic resin; and
a high-refractive-index layer, which is layered on at least one surface of the base material layer, and which has a refractive index that is higher than the refractive index of the base material layer, wherein
the high-refractive-index layer includes a polymer of a resin material that includes: a urethane (meth)acrylate derived from a fluorene-based diol, an isocyanate and a (meth)acrylate; and a (meth)acrylate,
which further has a low-refractive-index layer having a refractive index that is lower than the refractive index of the base material layer, wherein the low-refractive-index layer is layered on the surface of the high-refractive-index layer and the surface is opposite to the base material layer, the base material layer has a thickness of 50 to 500 μm, the high-refractive-index layer has a thickness of 10 to 200 nm and the low-refractive-index layer has a thickness of 10 to 200 nm.

20. An anti-reflection film, which has:
a base material layer including a thermoplastic resin; and
a high-refractive-index layer, which is layered on at least one surface of the base material layer, and which has a refractive index that is higher than the refractive index of the base material layer, wherein
the high-refractive-index layer includes a polymer of a resin material that includes: a urethane (meth)acrylate derived from a fluorene-based diol, an isocyanate and a (meth)acrylate; and a (meth)acrylate, and
wherein regarding a sample of the anti-reflection film obtained by being cut into a size of 210 mm×297 mm×0.3 mm (thickness), when the base material layer is preheated at 190° C. for 40 seconds, the sample is placed in a mold including a right angle-shaped projection having a deep drawing height of 1 mm or more and a size of 30 mm×30 mm in a manner such that the base material layer is in contact with the mold, and the sample is subjected to pressure forming using high pressure air of 1.5 MPa, the radius R of an area in which a pressure formed body obtained is in contact with the right angle-shaped portion of the mold is 3.0 mm or less.

* * * * *